(12) United States Patent
Winarski

(10) Patent No.: US 12,242,421 B2
(45) Date of Patent: *Mar. 4, 2025

(54) BLOCKCHAIN MANAGEMENT THROUGH A GRAPHICAL USER INTERFACE

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 808 days.

This patent is subject to a terminal disclaimer.

(21) Appl. No.: 17/395,692

(22) Filed: Aug. 6, 2021

(65) Prior Publication Data

US 2022/0060336 A1 Feb. 24, 2022

Related U.S. Application Data

(60) Provisional application No. 63/069,016, filed on Aug. 22, 2020.

(51) Int. Cl.
| | |
|---|---|
| *G06F 3/0482* | (2013.01) |
| *G06F 3/04817* | (2022.01) |
| *G06F 3/0486* | (2013.01) |
| *G06F 9/451* | (2018.01) |
| *G06F 16/11* | (2019.01) |
| *G06F 16/13* | (2019.01) |
| *G06F 16/16* | (2019.01) |
| *G06F 16/188* | (2019.01) |

(Continued)

(52) U.S. Cl.
CPC ........ *G06F 16/168* (2019.01); *G06F 3/04817* (2013.01); *G06F 3/0482* (2013.01); *G06F 3/0486* (2013.01); *G06F 9/451* (2018.02);
*G06F 16/116* (2019.01); *G06F 16/137* (2019.01); *G06F 16/188* (2019.01); *G06F 21/602* (2013.01); *H04L 9/3239* (2013.01); *H04L 9/50* (2022.05)

(58) Field of Classification Search
CPC .................. G06F 3/048–05; G06F 16/168
See application file for complete search history.

(56) References Cited

U.S. PATENT DOCUMENTS

2017/0085545 A1* 3/2017 Lohe ................. G06Q 20/10
2018/0198624 A1* 7/2018 Bisti .................. H04L 9/3247
(Continued)

*Primary Examiner* — Daniel Rodriguez
(74) *Attorney, Agent, or Firm* — The Winarski Firm, PLLC

(57) ABSTRACT

The present specification discloses a blockchain computer application. This blockchain computer application includes a Graphical User Interface (GUI) that supports the organization and blockchaining of files to a blockchain. This GUI includes a virtual blockchain organizational tool onto which users can drag and drop files and organize them into various virtual blockchain blocks without permanently attaching those files to an actual blockchain until the virtual blockchain is converted to an actual blockchain. The conversion process preserves the organizational structure of the files set within the virtual blockchain. Files may also be automatically blockchained to a specific blockchain by dragging them and dropping them onto a blockchain application desktop icon. Files may also be automatically blockchained to specific blockchains by dragging them and dropping them onto a blockchain icon within the GUI where each blockchain icon is directly associated with a separate blockchain.

20 Claims, 28 Drawing Sheets

(51) Int. Cl.
*G06F 21/60* (2013.01)
*H04L 9/32* (2006.01)
*H04L 9/00* (2022.01)

(56) References Cited

U.S. PATENT DOCUMENTS

| | | | |
|---|---|---|---|
| 2018/0204213 A1* | 7/2018 | Zappier | H04L 63/08 |
| 2019/0317935 A1* | 10/2019 | Berti | G06F 16/27 |
| 2020/0125750 A1* | 4/2020 | Hatami | H04L 63/105 |
| 2021/0157797 A1* | 5/2021 | Dutchak | G06Q 20/3678 |
| 2022/0043919 A1* | 2/2022 | Crumb | H04N 7/155 |
| 2023/0368296 A1* | 11/2023 | Hara | G06Q 20/389 |

* cited by examiner

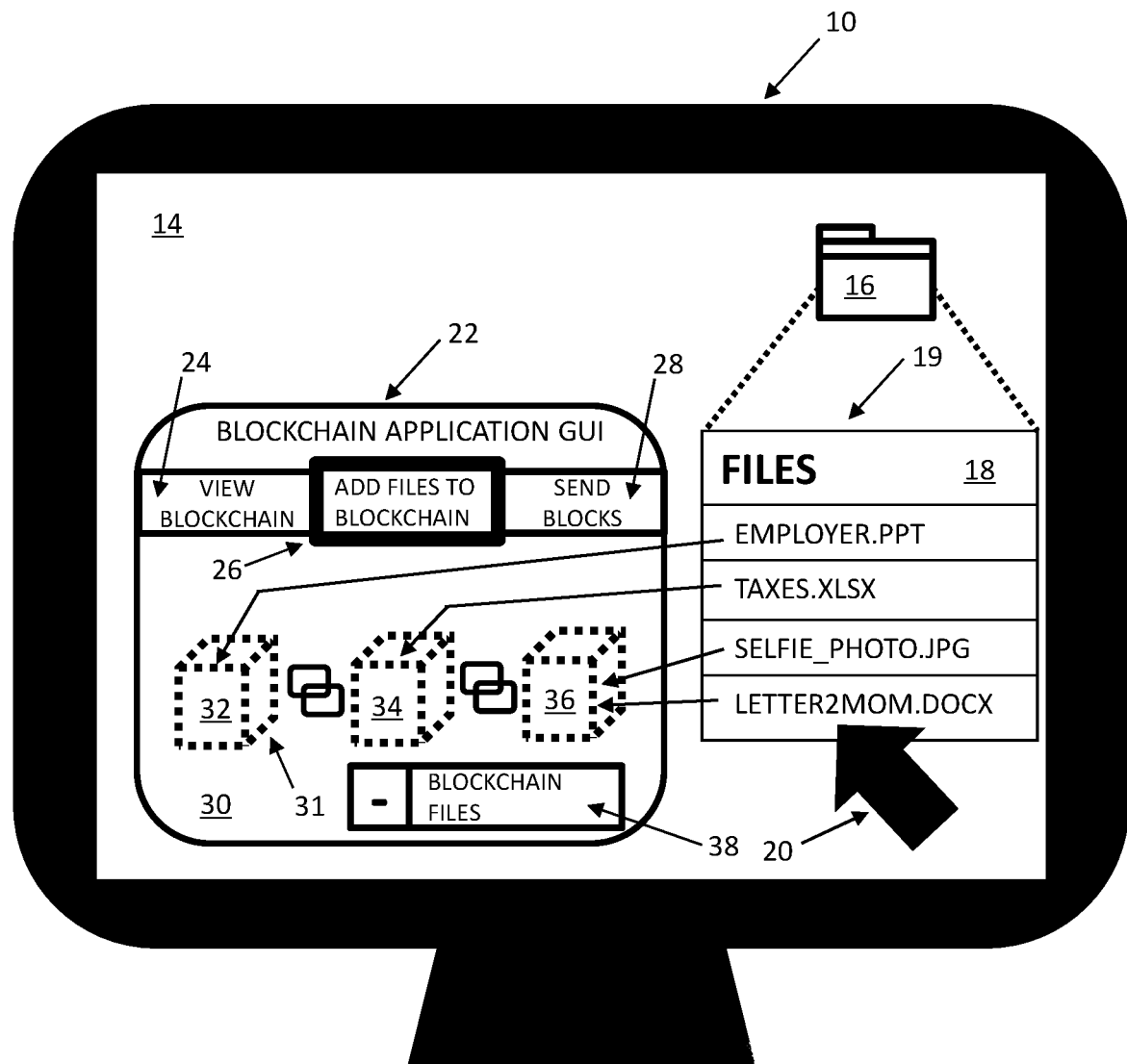
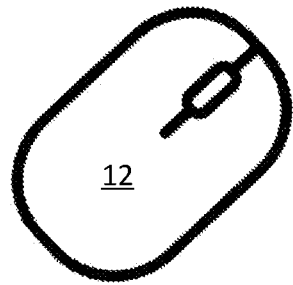
FIG. 1

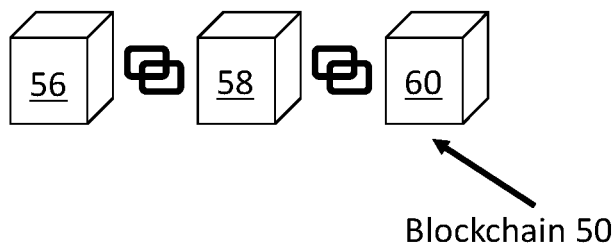

Blockchain 50

| ACTUAL BLOCKCHAIN BLOCK 56 | INFORMATION IN BLOCK:<br>*Header<br>*Blockchain Data: EMPLOYER1.PPT, EMPLOYER2.PPT<br>*Hash digest of prior blockchain block 54 and hash digest of current blockchain block 56 |
|---|---|

| ACTUAL BLOCKCHAIN BLOCK 58 | INFORMATION IN BLOCK:<br>*Header<br>*Blockchain Data: TAXES1.XLSX, TAXES2.XLSX, TAXES3.XLSX, TAXES4.XLSX<br>*Hash digest of prior blockchain block 56 and hash digest of current blockchain block 58 |
|---|---|

| ACTUAL BLOCKCHAIN BLOCK 60 | INFORMATION IN BLOCK:<br>*Header<br>*Blockchain Data: SELFIE_PHOTO1.JPG, SELFIE_PHOTO2.JPG, SELFIE_PHOTO3.JPG, LTR2MOM1.DOCX, LTR2MOM2.DOCX<br>*Hash digest of prior blockchain block 58 and hash digest of current blockchain block 60 |
|---|---|

FIG. 6

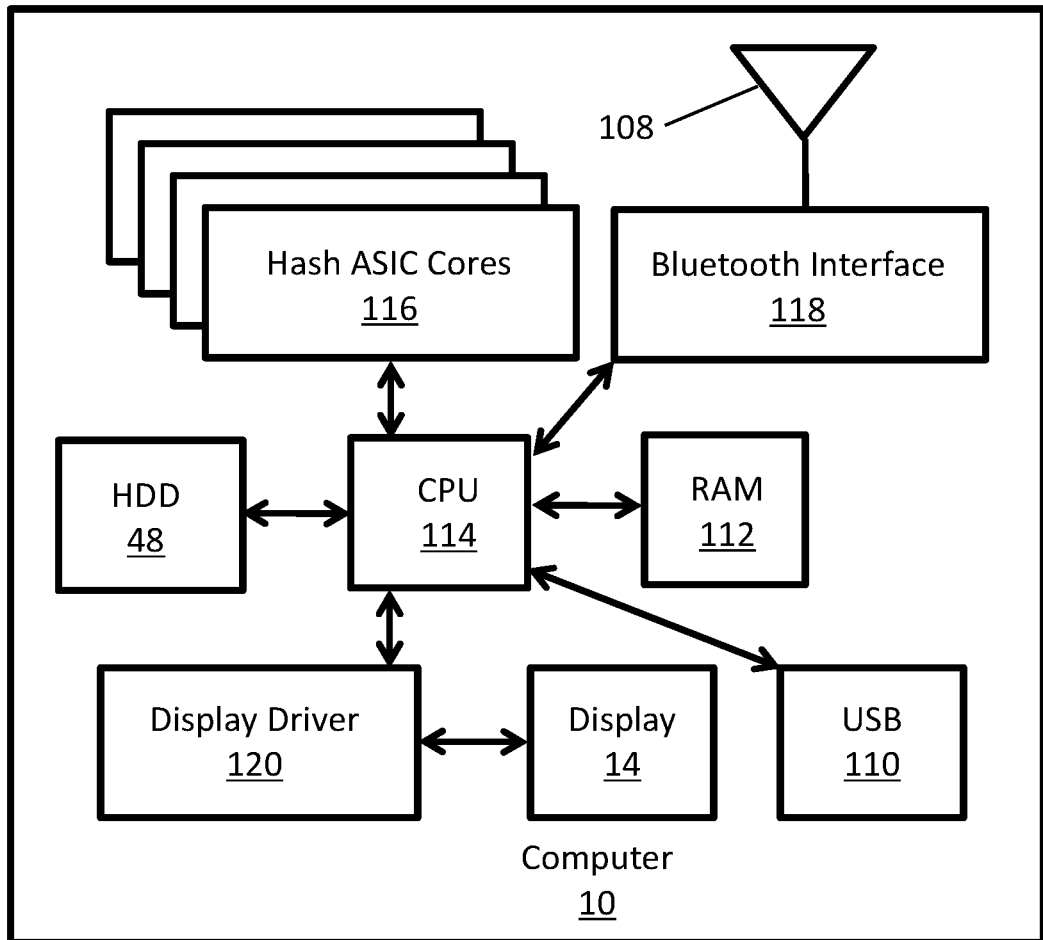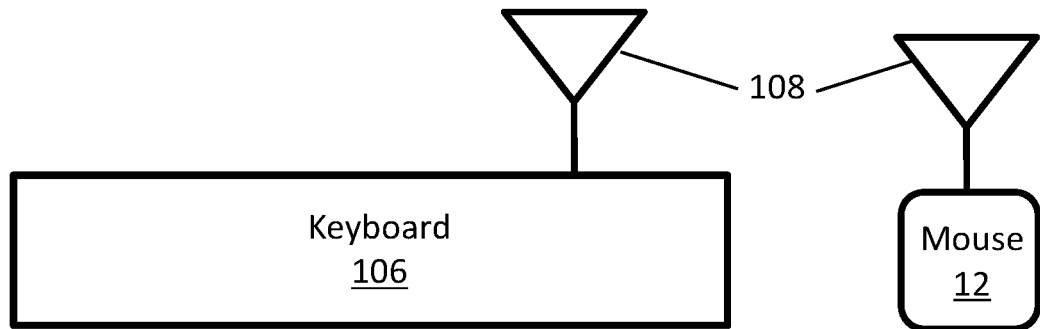
FIG. 16

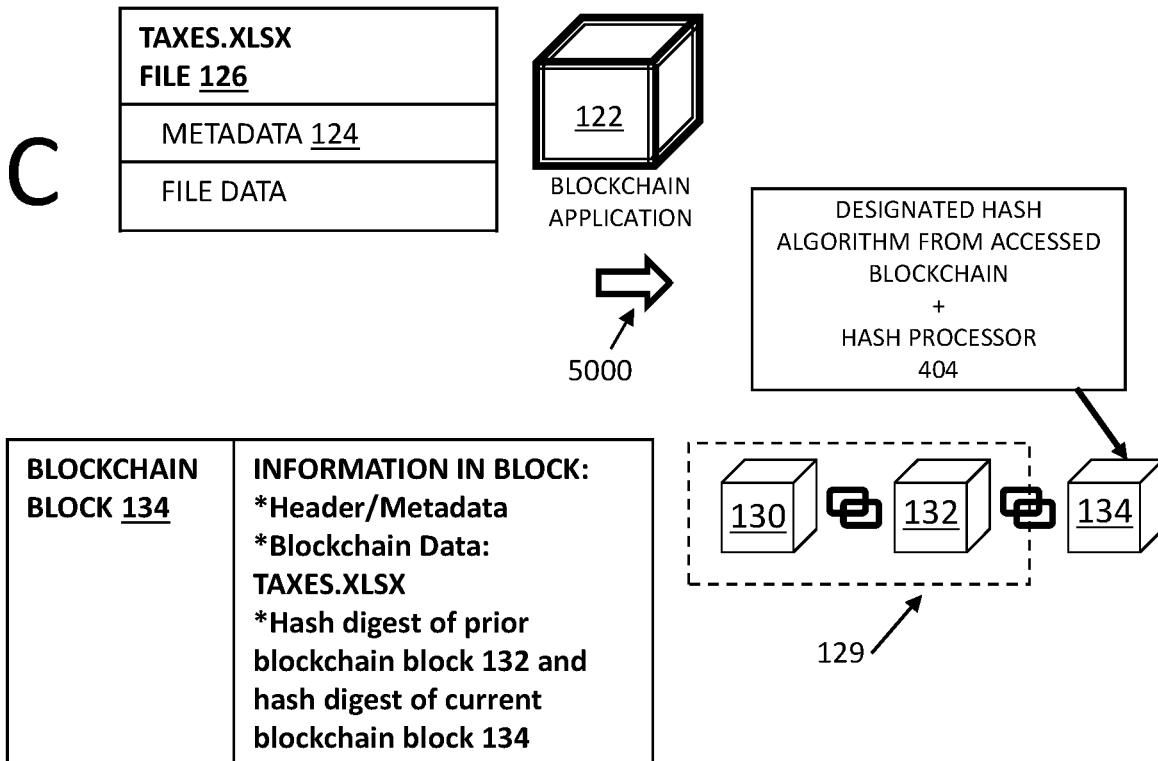
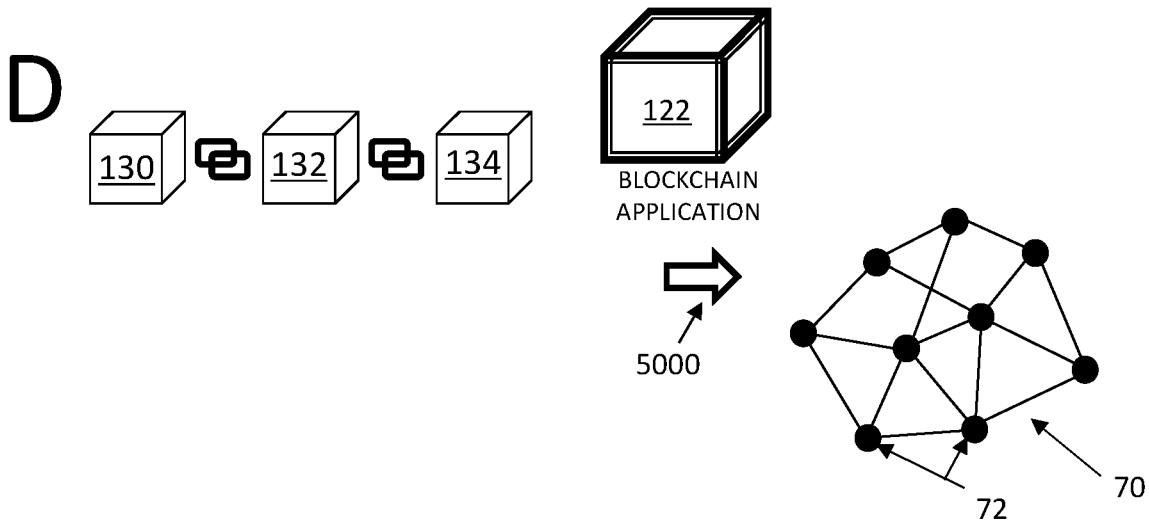
FIG. 19

BLOCKCHAIN MANAGEMENT THROUGH A GRAPHICAL USER INTERFACE

FIELD OF THE INVENTION

The present disclosure relates to the field of computer applications for blockchaining files through a Graphical User Interface (GUI).

BACKGROUND

A blockchain is a continuously growing list of records, called blocks, which are linked and secured using cryptography. Each block typically contains a cryptographic hash of the previous block, a timestamp, and transaction data. By design, a blockchain is inherently resistant to modification of the data. It is an open, distributed ledger that can record transactions between two parties efficiently and in a verifiable and permanent way. For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. Blockchains are secure by design and are an example of a distributed computing system with high Byzantine fault tolerance. Decentralized consensus has therefore, been achieved with a blockchain. This makes blockchains potentially suitable for the recording of events, medical records, and other records management activities, such as identity management, transaction processing, documenting provenance, food traceability, or voting. The first work on a cryptographically secured chain of blocks was described in 1991 by Stuart Haber and W. Scott Stornetta. In 1992, Bayer, Haber, and Stornetta incorporated Merkle trees to the design, which improved its efficiency by allowing several documents to be collected into one block.

SUMMARY

Blockchains provide a secure method for securing data and files in a tamper resistant file storage system. It is desirable to incorporate the use of tamper resistant blockchains with stored files and digital records to secure their file integrity. The present specification discloses a computer application in which users can access files from a desktop file manager and then drag and drop them using a mouse onto specific virtual blockchain blocks shown within a Graphical User Interface (GUI) of a blockchain application. The virtual blockchain is not an actual blockchain, but a virtual tool in which users can associate files with particular virtual blockchain blocks, which is actually designated through the inclusion of metadata for the associated files with the specified virtual blockchain blocks. Through this system, a user can specify which files are to be grouped together into which particular blockchain blocks for ease of location and access. Thus, a user can have one virtual blockchain block dedicated to tax records, another virtual blockchain block dedicated to medical records, another virtual blockchain block dedicated to employment records, and so on. The virtual blockchain functions as a virtual organizational tool in which users can add, organize, and rearrange the placement of files within the virtual blockchain. Once a user is satisfied with the placement and arrangement of the files within the virtual blockchain, the user may then convert the virtual blockchain into an actual blockchain by use of the computer blockchain application. The computer blockchain application uses the virtual blockchain from the GUI as a template to make the new actual real blockchain blocks. The computer blockchain application accesses the metadata contained within the virtual blockchain to access the files meant to be included as data within each actual real blockchain block. The computer blockchain application accesses each of these files and groups them into a single file for hashing. The computer blockchain application then combines the hash of the files and the hash from the previous blockchain block to create a new actual real blockchain block for addition to the blockchain. The computer blockchain application grants users the ability to access any stored blockchain from a listing of blockchains within the GUI. The user may then view and access all of the files stored within that blockchain. Alternatively, the user may then view a selected blockchain on the GUI of the computer blockchain application and select to view the files stored within individual blockchain blocks by using the mouse to select an individual blockchain block on the GUI. The user may select to send one or more files or blockchain blocks to a third party for review through the computer blockchain application, such as sending the blockchain block containing all of the tax records to their accountant. This transmission of the blockchain block may include credentials in order to access the files contained within the blockchain block. Blockchain blocks created through the computer blockchain application may be stored on a commercial distributed network that the user has access to on a subscription basis. Alternatively, the user may elect to utilize their own personal devices to create an ad-hoc private distributed network. These personal devices may include a desktop computer, a laptop computer, one or more cell phones, one or more external drives, tablets, and accessible cloud storage accounts. One goal of this disclosure is to facilitate the ease of organizing and grouping data through criteria focused blockchains that receive new files in new blockchain blocks through a GUI that supports easy organization and grouping of files for storage and future location and access.

The present specification discloses a computer tangible medium containing instructions for a method of creating blockchains that have files as data using a computer application. One or more virtual blockchain blocks are displayed on a Graphical User Interface (GUI). Files are associated with the one or more virtual blockchain blocks through selecting files from a file manager and identifying a selected virtual blockchain block to which the selected files are to be associated with through the use of a Graphical User Interface (GUI) pointing device and then adding metadata identifying the selected files to the selected virtual blockchain block. The selected virtual blockchain block is converted to an actual new blockchain block linked to a blockchain by accessing the selected files using the metadata from the selected virtual blockchain block and creating a blockchain hash based on the selected files and a previous blockchain block where the actual new blockchain block includes the blockchain hash and the selected files as data. Rules may be applied to the one or more virtual blockchain blocks that prevent files from being associated to specified virtual blockchain blocks based on file type, file name, file size, or any other criteria inherent to the file. Two or more virtual blockchain blocks are displayed on the GUI at a time to enable different files selected from the file manager to be associated with different virtual blockchain blocks prior to adding them to the blockchain. In addition, more than one file may be added to one virtual blockchain block. The more than one file may be combined into a single contiguous file prior to adding it to the blockchain through the blockchain hashing process, wherein the single contiguous file is a ZIP file. Different types of files may be added to one virtual blockchain block such as word processing files, spreadsheet files, executable files, image files, media files, video files, music files, text files, message files, email files, financial records, medical records, tax records, telephone records, and data files. The virtual blockchain blocks do not contain blockchain hash information from the blockchain or from other virtual blockchain blocks. Each virtual blockchain block is converted into the actual new blockchain block while preserving the organization of files amongst the different virtual blockchain blocks as specified by the associated metadata. The actual new blockchain block is distributed on to a public distributed network, or onto a private distributed network formed of personal devices that include a personal computer, an external drive, a mobile phone, a tablet, and a cloud storage system.

The present specification discloses a computer tangible medium containing instructions for a method for accessing files from a blockchain with a blockchain application. Metadata is extracted from a particular blockchain storing files within its blockchain blocks. A virtual blockchain is generated on a Graphical User Interface that is populated with the extracted metadata. A listing of the stored files for a particular blockchain block is displayed using the extracted metadata when a Graphical User Interface pointing device is pointing at the particular blockchain block selected from the virtual blockchain. A selected file is accessed from the blockchain when it is selected from the listing using the Graphical User Interface pointing device. A searchable listing is generated of the stored files from the metadata extracted from the blockchain. A listing is displayed of blockchains accessible by the blockchain application. The particular blockchain is selected from the listing of blockchains to display on the Graphical User Interface. The files may include word processing files, spreadsheet files, executable files, image files, media files, video files, music files, text files, message files, email files, financial records, medical records, tax records, telephone records, and any type of data files. A searched for file is selected from the searchable listing with the Graphical User Interface pointing device. The searched for file is opened with an associated computer application. The particular blockchain may be retrieved from a node of a distributed network. The distributed network is then polled to determine if the particular blockchain matches a majority of copies of the particular blockchain stored on the distributed network. The blockchain application is allowed to use the particular blockchain when the particular blockchain matches the majority of copies. The blockchain application is denied from using the particular blockchain when the particular blockchain does not match the majority of copies. A blockchain alert message is generated on the blockchain application when the particular blockchain does not match the majority of copies.

The present specification discloses a computer tangible medium containing instructions for a method of distributing files onto a private distributed network through a blockchain. Files are selectively integrated from a file manager into a blockchain by placing metadata for each selected file within a specific virtual blockchain block of a virtual blockchain based upon the action of a Graphical User Interface pointing device where the virtual blockchain is displayed within a Graphical User Interface of a blockchain application. The virtual blockchain is converted into actual new blockchain blocks that are a part of the blockchain by accessing the selected files using the metadata from the virtual blockchain and creating blockchain hashes based on the selected files and previous blockchain blocks for inclusion with each actual new blockchain block where each actual new blockchain block includes the selected files associated with its corresponding virtual blockchain block as data. The blockchain is distributed onto a private distributed network for storage that is formed of nodes that are each a device or cloud account exclusively accessible by the blockchain application. The private distributed network is formed of devices or cloud accounts that are not publicly accessible such as a personal computer, an external drive, a mobile phone, a tablet, and a private account on a cloud storage system. A particular blockchain block may be accessed from the blockchain stored on the private distributed network. The private distributed network is polled to determine if the particular blockchain matches a majority of copies of the particular blockchain stored on the private distributed network. The blockchain application is allowed to use the particular blockchain when the particular blockchain matches the majority of copies. The blockchain application is denied from using the particular blockchain when the particular blockchain does not match the majority of copies. Rules are applied to the virtual blockchain that prevent files from being associated to specified virtual blockchain blocks based on file type, file name, or file size. The files may be word processing files, spreadsheet files, executable files, image files, media files, video files, music files, text files, message files, email files, financial records, medical records, tax records, telephone records, and data files. An individual blockchain block may be distributed from the blockchain stored on the private distributed network to a node outside of the private distributed network upon direction by the blockchain application. When this happens, credentials are provided to access the individual blockchain block to the node outside of the private distributed network.

The present specification also discloses a computer tangible medium containing instructions for a method of creating new blockchain blocks from files for a blockchain using a computer application. The method selects a file from a Graphical User Interface (GUI) with a pointing device and associates metadata from the selected file with a blockchain by dragging and dropping an icon of the selected file onto a desktop icon for a blockchain computer application. The method then creates a new blockchain block based on the selected file and a hash digest from a blockchain block from an end of the blockchain with the blockchain computer application automatically upon association of the metadata with the blockchain and also automatically appends the new blockchain block to the blockchain with the blockchain computer application. The method automatically creates the new blockchain block directly upon the occurrence of the dragging and dropping of the file onto the desktop icon. The dragging and dropping of the file onto the desktop icon is the trigger that causes the automatic blockchaining of the file to the blockchain. The automatic creation of a new blockchain block based on the file that was dragged and dropped occurs directly upon the occurrence of the file being dragged and dropped onto the icon. The method also accesses the selected file based on the associated metadata from a storage device with the blockchain computer application. Selecting the blockchain for appending the new blockchain block to also occurs through the blockchain computer application along with distributing the new blockchain block onto a distributed network. The method may access the blockchain from a distributed network or a local storage device with the blockchain computer application.

The present specification also discloses a computer tangible medium containing instructions for a method of creating new blockchain blocks from files for a blockchain using a computer application. This method includes displaying multiple different blockchain icons on a Graphical User Interface (GUI) for a blockchain application where each blockchain icon is associated with a different blockchain. Metadata for a file is associated with one of the different blockchains by dragging and dropping a file icon associated with the file onto the blockchain icon associated with that one blockchain. The file is automatically blockchained to that one blockchain by generating a new blockchain block containing the file as data. The method automatically creates the new blockchain block directly upon the occurrence of the dragging and dropping of the file onto the desktop icon. The dragging and dropping of the file onto the desktop icon is the trigger that causes the automatic blockchaining of the file to the blockchain. The automatic creation of a new blockchain block based on the file that was dragged and dropped occurs directly upon the occurrence of the file being dragged and dropped onto the icon. Rules are designated for the blockchain icons as to whether a specific file can have its metadata associated with any of the different blockchains based on criteria of the specific file contained within its metadata. These criteria include file size, file type, a computer application associated with the file, hashtags specified within the metadata of the specific file, and file date. The specific file is not allowed to be dropped and dragged onto a blockchain icon that has a rule that prevents it from being blockchained to the associated blockchain. The specific file is allowed to be dropped and dragged onto a blockchain icon that lacks a rule that prevents it from being blockchained to the associated blockchain. Once created, the method distributes the new blockchain block onto a distributed network. Each blockchain icon displayed within the GUI for the blockchain application may have a different name, a different shape, or a different color. The rules may designate that each blockchain contain a different category of files based upon the criteria.

Further aspects of the invention will become apparent as the following description proceeds and the features of novelty, which characterize this invention, are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 1 depicts a desktop computer having a monitor that is currently displaying a Graphical User Interface (GUI) of a blockchain application along with a file folder on the monitor desktop in which a GUI pointing device is dragging and dropping selected files from the file folder onto virtual blockchain blocks shown in the blockchain application GUI;

FIG. 6 illustrates a set of tables showing what data and metadata is contained within each actual blockchain block that has been converted from the virtual blockchain blocks shown in FIG. 4;

FIG. 16 illustrates a block diagram of a computer system that runs the blockchain application;

FIGS. 17-21 illustrate an alternative Graphical User Interface for blockchaining files to a blockchain in which a user would drag and drop a file onto a desktop icon associated with a blockchain computer application that results in the automatic blockchaining of that file to a blockchain designated by the computer blockchain application;

FIG. 17 depicts a Graphical User Interface for blockchaining files to a blockchain in which a user would drag and drop a file onto a desktop icon associated with a blockchain computer application that results in the automatic blockchaining of that file to a blockchain designated by the computer blockchain application;

FIG. 18 illustrates a flow block diagram of the start of a process for automatically adding a file to a blockchain by use of a Graphical User Interface pointer dragging and dropping that file icon onto a desktop icon for a blockchain computer application for automatic blockchaining of that file to the blockchain;

FIG. 19 illustrates a flow block diagram of the end of a process for automatically adding a file to a blockchain by use of a Graphical User Interface pointer dragging and dropping a file icon onto a desktop icon for a blockchain computer application for automatic blockchaining of that file to the blockchain;

FIG. 20 illustrates a Graphical User Interface for Settings for a blockchain computer desktop application where a user can designate a particular blockchain file to which files dragged and dropped onto the desktop icon for the blockchain computer application are added along with the ability to view various parameters of the blockchain such as the hash algorithm used and types of hash digests used from the metadata of the selected blockchain;

FIG. 21 illustrates a flow chart depicting a process for automatically adding a file to a blockchain by use of a Graphical User Interface pointer dragging and dropping a file icon onto a desktop icon for a blockchain computer application that automatically blockchains that file to a designated blockchain;

FIG. 24 depicts a process of using a Graphical User Interface (GUI) pointing device to select a file from a file menu and dragging and dropping it onto a GUI icon within the application in which the icon is directly associated with a designated blockchain for automatic blockchaining of that file to that blockchain;

FIG. 25 illustrates a flow block diagram illustrating the process of applying the file rule engine from FIG. 3 to the dragging and dropping of files onto a GUI icon associated with a designated blockchain for automatic blockchaining of that file to that blockchain;

FIG. 26 illustrates a flow block diagram illustrating the process of blockchaining files to a blockchain in which a user would drag and drop a file onto one of a plurality of icons displayed in the GUI of the application where each icon is directly associated with a specific dedicated blockchain for automatic blockchaining of that file to that blockchain;

FIG. 27 illustrates a series of Graphical User Interface (GUI) drop down menus for the computer application for automatically blockchaining of files that are dragged and dropped onto an icon directly associated with a specific blockchain; and FIG. 28 illustrates a flow chart depicting a process for using a Graphical User Interface (GUI) pointing device to select a file from a file menu and dragging and dropping it onto a GUI icon within a desktop computer application for blockchain files in which the icon is directly associated with a designated blockchain for automatic blockchaining of that file to the blockchain.

DETAILED DESCRIPTION

While the invention has been shown and described with reference to a particular embodiment thereof, it will be understood to those skilled in the art, that various changes in form and details may be made therein without departing from the spirit and scope of the invention.

Figure 5:
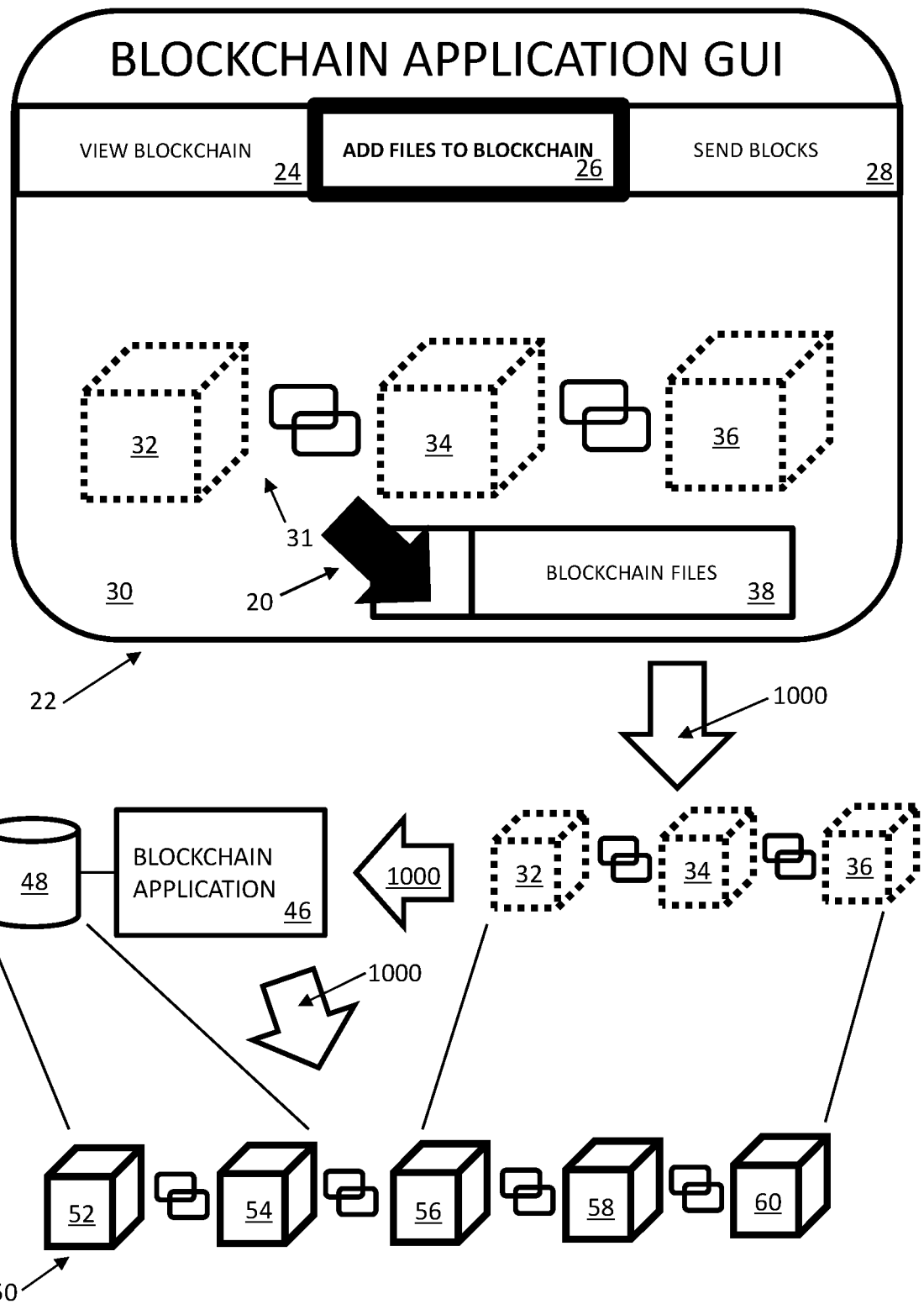
FIG. 5 illustrates a process for converting virtual blockchain blocks into actual real blockchain blocks that are attached to an existing blockchain.

FIG. 1 depicts a desktop computer having a monitor that is currently displaying a Graphical User Interface (GUI) of a blockchain application along with a file folder on the monitor desktop in which a GUI pointing device is dragging and dropping selected files from the file folder onto virtual blockchain blocks shown in the blockchain application GUI. A conventional desktop computer 10 is shown in FIG. 1. Computer 10 may be an APPLE® iMAC® computer, for example. Computer 10 includes a Graphical User Interface (GUI) pointing device 12 that is in communication with computer 10. Computer 10 includes a display screen 14 upon which various computer applications may be accessed and used through Graphical User Interfaces (GUIs). For example, a desktop file folder 16 containing files 18 is shown that can be accessed and expanded to reveal a file table 19 that includes a listing of exemplary files 18, which are stored within desktop file folder 16. These files 18 include an exemplary POWERPOINT® file employer.ppt, an exemplary EXCEL® file taxes.xlsx, an exemplary image file selfie_photo.jpg, and an exemplary WORD™ file letter2mom.docx. File folder 16 is a graphical user interface that is a part of a file manager application that is a part of the operating system for computer 10. The file manager application allows a user to create, rename, move, print, copy, search for, and delete files and directories, as well as to set permissions (attributes) such as archive, read-only, hidden or system, and to associate file types with programs. File folder 16 is created and managed by the file manager application. GUI pointing device 12 may be used to direct the motion of pointer 20 on display screen 14. A GUI 22 of a blockchain computer application is shown being displayed on computer display 22. The blockchain computer application runs on the operating system of computer 10. The blockchain computer application allows for a variety of interactions and functions between files 18 stored on computer 10. Files 18 may also be stored on a hard disk drive, solid state drive, or optical disk drive external to computer 10, or a cloud storage system remotely accessible through the Internet. The blockchain application allows for the storage of files 18 within a blockchain. The blockchain application also allows for the accessing and viewing of files 18 that are stored within a blockchain. The blockchain application further allows for the transmission of individual blockchain blocks or files from within the blockchain to other computer nodes for access and viewing. With these primary functions, the blockchain application enables the storage, access, viewing, and sharing of files using a blockchain through a Graphical User Interface (GUI) 22 viewable on display 14. The use of a blockchain provides enhanced security to the files stored within it from hacking or tampering by unauthorized entities. A user can access these different functions through a variety of GUI buttons 24, 26, and 28. GUI button 24 provides access to functionality within the blockchain application for viewing files within a blockchain. GUI button 26 provides access to functionality for adding files 18 to a blockchain 50 through virtual blockchain 31. GUI button 28 provides access to functionality for sending blockchain blocks or files from within the blockchain blocks to other users, network nodes, or other networks. The blockchain computer application allows for the accessing of files 18 from a desktop file manager, such as folder 16, and then drag and drop them using a mouse 12 onto specific virtual blockchain blocks 31 shown within a Graphical User Interface (GUI) 22 of a blockchain application. When files 18 are dragged and dropped onto the virtual blockchain 31, it is contemplated that it is actually a metadata icon that is associated with the actual file that is being dragged and dropped. The virtual blockchain 31 is not an actual blockchain, but a virtual tool in which users can associate files 18 with particular virtual blockchain blocks 32, 34, and 36, which is actually designated through the inclusion of metadata for the associated files 18 with the specified virtual blockchain blocks 32, 34, and 36. Through this system, a user can specify which files 18 are to be grouped together into which particular blockchain blocks 32, 34, or 36. Thus, a user can have one virtual blockchain block 32, 34, or 36 dedicated to tax records 18, another virtual blockchain block 32, 34, or 36 dedicated to medical records 18, another virtual blockchain block 32, 34, or 36 dedicated to employment records 18, and so on. The virtual blockchain 31 functions as a virtual organizational tool in which users and add, organize, and rearrange the placement of files 18 within the virtual blockchain 31. Once a user is satisfied with the placement and arrangement of the files 18 within the virtual blockchain 31, the user may then convert the virtual blockchain 31 into an actual blockchain 50, as shown in FIG. 5, by use of the computer blockchain application. The computer blockchain application uses the virtual blockchain 31 from the GUI 22 as a template to make the new actual real blockchain blocks 56, 58, and 60.

When button 26 is selected with pointer 20 and mouse 12, a user may add selected files 18 from folder 16 to blockchain 50 through virtual blockchain 31. Each file 18 includes metadata identifying the file name, storage location, and other attributes of the file such as file type and file size, for example. Virtual blockchain 31 is not an actual blockchain 50 shown in FIG. 5. Virtual blockchain 31 is an organizational tool displayed through GUI 22 that enables a user to organize the storage of files 18 within particular blockchain blocks of a blockchain. The blockchain application then converts the virtual blockchain 31 into an actual real blockchain 50. A user utilizes mouse 12 to direct pointer 20 to select a file 18 from folder 16 and drag and drop it onto one of the virtual blockchain blocks 32, 34, or 36 within virtual blockchain 31. Dragging and dropping a particular file 18 from folder 16 onto a particular virtual blockchain block 32, 34, or 36 causes metadata from that particular file 18 to be associated with the selected virtual blockchain block 32, 34, or 36. With the virtual blockchain 31, the actual file 18 is not stored within any of the virtual blockchain blocks 32, 34, or 36. Instead, metadata from the file 18 is associated with the virtual blockchain block 32, 34, or 36. The process of converting the virtual blockchain 31 into an actual blockchain 50 includes storing the selected file 18 into the actual real blockchain. The process of converting the virtual blockchain 31 into an actual real blockchain occurs automatically upon the triggering action of pressing the GUI button 38 marked "blockchain files" using pointer 20.

In the process of converting the virtual blockchain 31 into an actual real blockchain 50, the blockchain application automatically accesses the metadata contained within the virtual blockchain 31 to access the files 18 meant to be included as data within each actual real blockchain block of actual real blockchain 50. The computer blockchain application accesses each of these files 18 and groups them into a single file for hashing, such as through use of a data compression process in which multiple files and/or directories may be combined into a single file format, such as a ZIP file format. The computer blockchain application then combines the hash of the file(s) 18 and the hash from the previous blockchain block to create a new actual real blockchain block for addition to the blockchain 50. In FIG. 1, GUI button 26 is shown in BOLD to signify the fact that the blockchain application feature that allows for the addition of files to an actual real blockchain through a virtual blockchain organization process has been selected. Due to the fact that button 26 has been selected, virtual blockchain 31 is shown displayed within a view screen of GUI 22. Virtual blockchain 31 is a Graphical User Interface virtual blockchain organizational tool 31 that allows users to selectively decide which virtual blockchain blocks 32, 34, or 36 will contain which files 18 via pointer 20. Virtual blockchain 31 is shown having three exemplary virtual blockchain blocks 32, 34, and 36. The use of three virtual blockchain blocks is exemplary. Virtual blockchain 31 may be comprised of any number of virtual blockchain blocks. Virtual blockchain 31 is shown in dashed lines to signify that it is not an actual blockchain 50. Virtual blockchain does not contain any actual files 18 or hash digests that interlink the virtual blockchain blocks. Virtual blockchain 31 does have metadata of files 18 associated with it signifying which virtual blockchain blocks 32, 34, or 36 would contain which files 18. In contrast, each blockchain block of actual real blockchain 50 contains the metadata on files 18 as well as the data of file 18 along with hash digests of a previous blockchain block and a hash digest of the data within that blockchain block, which may be one file 18 or a combination of files 18. The blockchain application allows a user to selectively decide which virtual blockchain block 32, 34, and 36 will contain which file 18, thereby allowing users to have the freedom to organize files within a blockchain based upon the type of the files 18 or the content of the files 18. In this manner, a user may be able to place all of their tax records within one virtual blockchain block, legal files in another virtual blockchain block, and medical records in a different virtual blockchain block. Once a desired organization of files 18 within virtual blockchain 31 has been determined through the drag and drop actions of pointer 20 in combination with the files 18 within folder 16, then blockchain application will automatically convert virtual blockchain 31 into an actual real blockchain 50 through the pressing of GUI button 38 with pointer 20 to implement process 1000 shown in FIG. 8. Each virtual blockchain block is converted into the actual new blockchain block while preserving the organization of files 18 amongst the different virtual blockchain blocks as specified by the associated metadata. FIGS. 1-8 detail the process and functionality of adding files to a blockchain through the blockchain application's use of virtual blockchains. Once the files 18 have been added to an actual real blockchain 50 through new actual real blockchain blocks generated from the virtual blockchain blocks displayed and configured to be associated with file 18 on GUI 22, the new actual real blockchain blocks are added to a distributed network for storage. Blockchain blocks created through the computer blockchain application may be stored on a commercial distributed network that the user has access to on a subscription basis. Alternatively, the user may elect to utilize their own personal devices to create an ad-hoc private distributed network. These personal devices may include a desktop computer, a laptop computer, one or more cell phones, one or more external drives, tablets, and accessible cloud storage accounts. The use of distributed networks is discussed in more detail in FIGS. 14 and 15. FIG. 16 discusses the hardware of computer 10.

Figure 9:
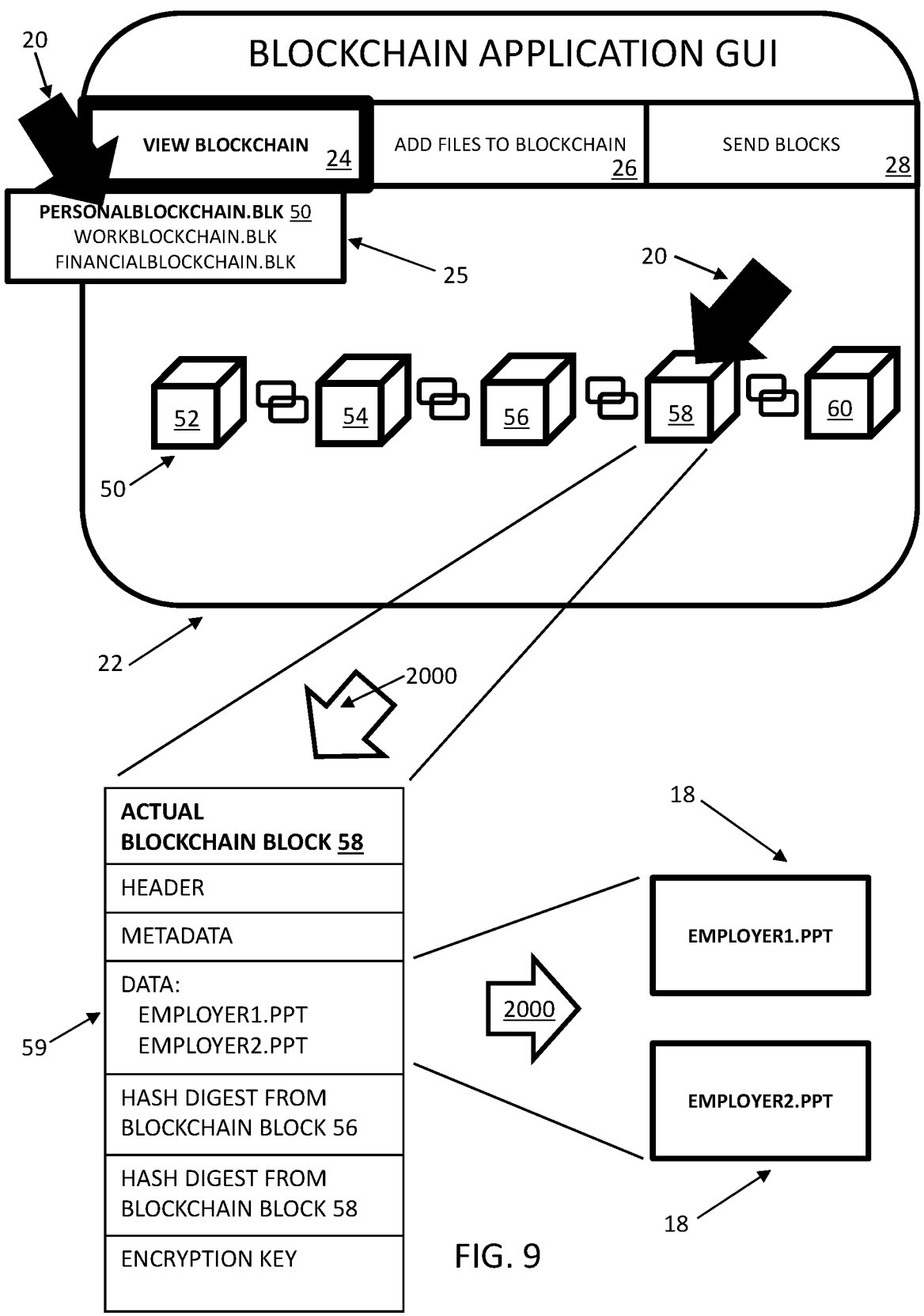
FIG. 9 depicts the Graphical User Interface (GUI) of the blockchain application in which the viewing of a blockchain option has been selected and a particular blockchain is chosen for viewing from a dropdown menu listing of blockchains available for viewing thereby allowing the viewing of files stored within the blockchain blocks.
Figure 10:
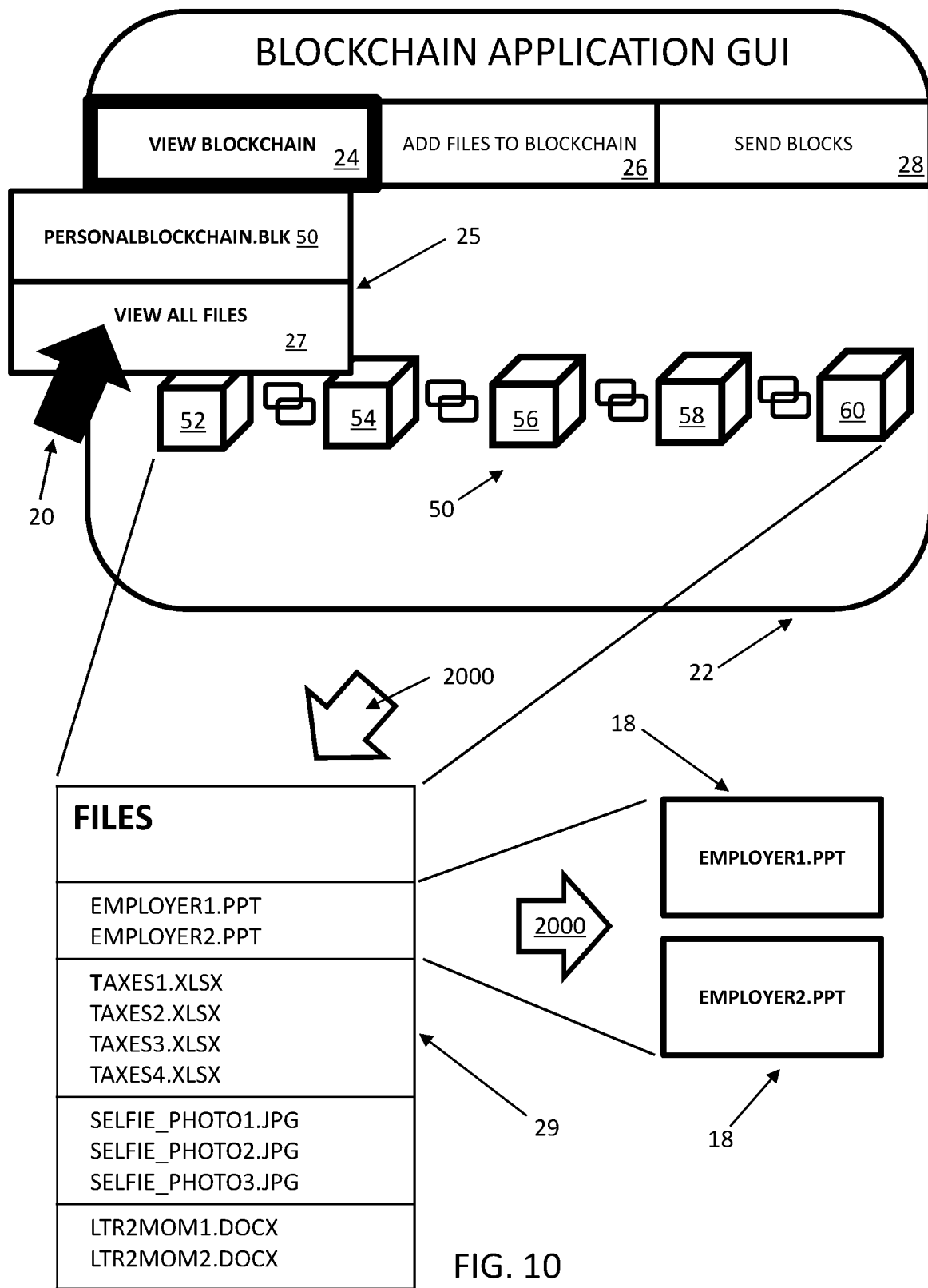
FIG. 10 depicts the Graphical User Interface (GUI) of the blockchain application in which the viewing of a blockchain option has been selected and a menu option to show all files in the blockchain.
Figure 11:
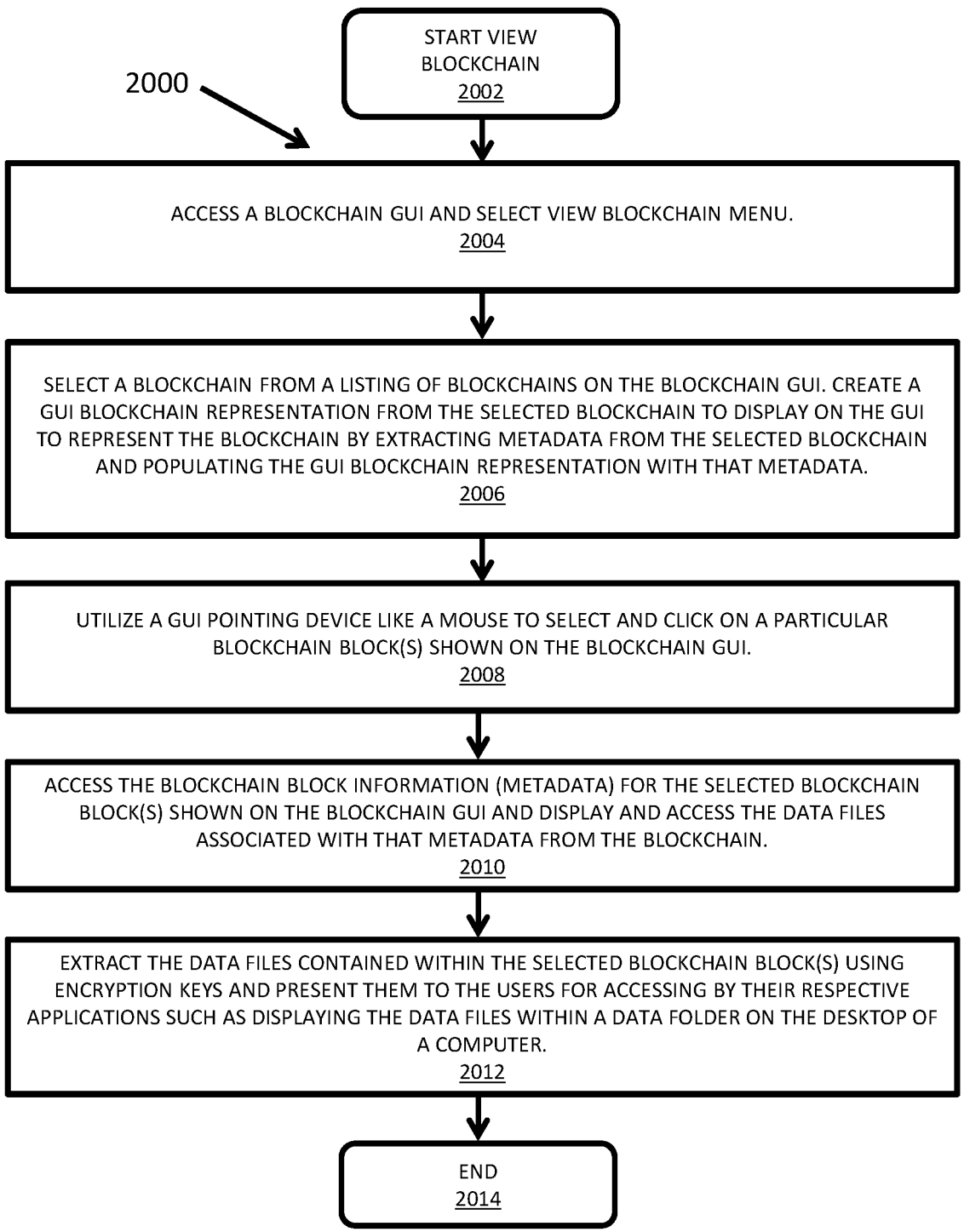
FIG. 11 illustrates a flowchart depicting a process for viewing files stored within a blockchain with the Graphical User Interface (GUI) of the blockchain application.
Figure 12:
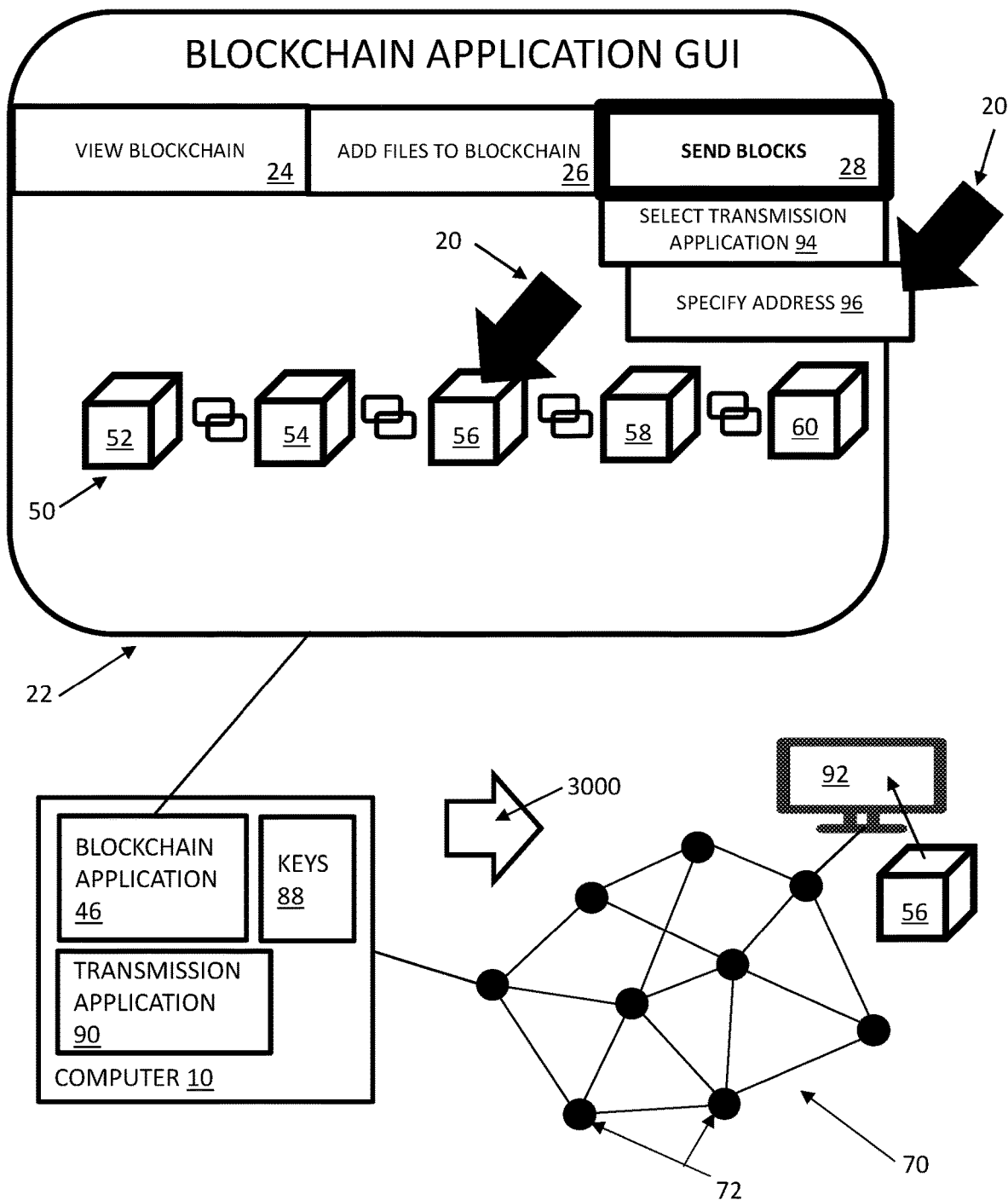
FIG. 12 illustrates the Graphical User Interface (GUI) of the blockchain application in which the sending of blockchain blocks option has been selected in which menu options to select a transmission application are displayed and allowing for the selection of which blockchain blocks are to be sent through the use of the GUI pointing device selecting blockchain blocks from the blockchain on the GUI.
Figure 13:
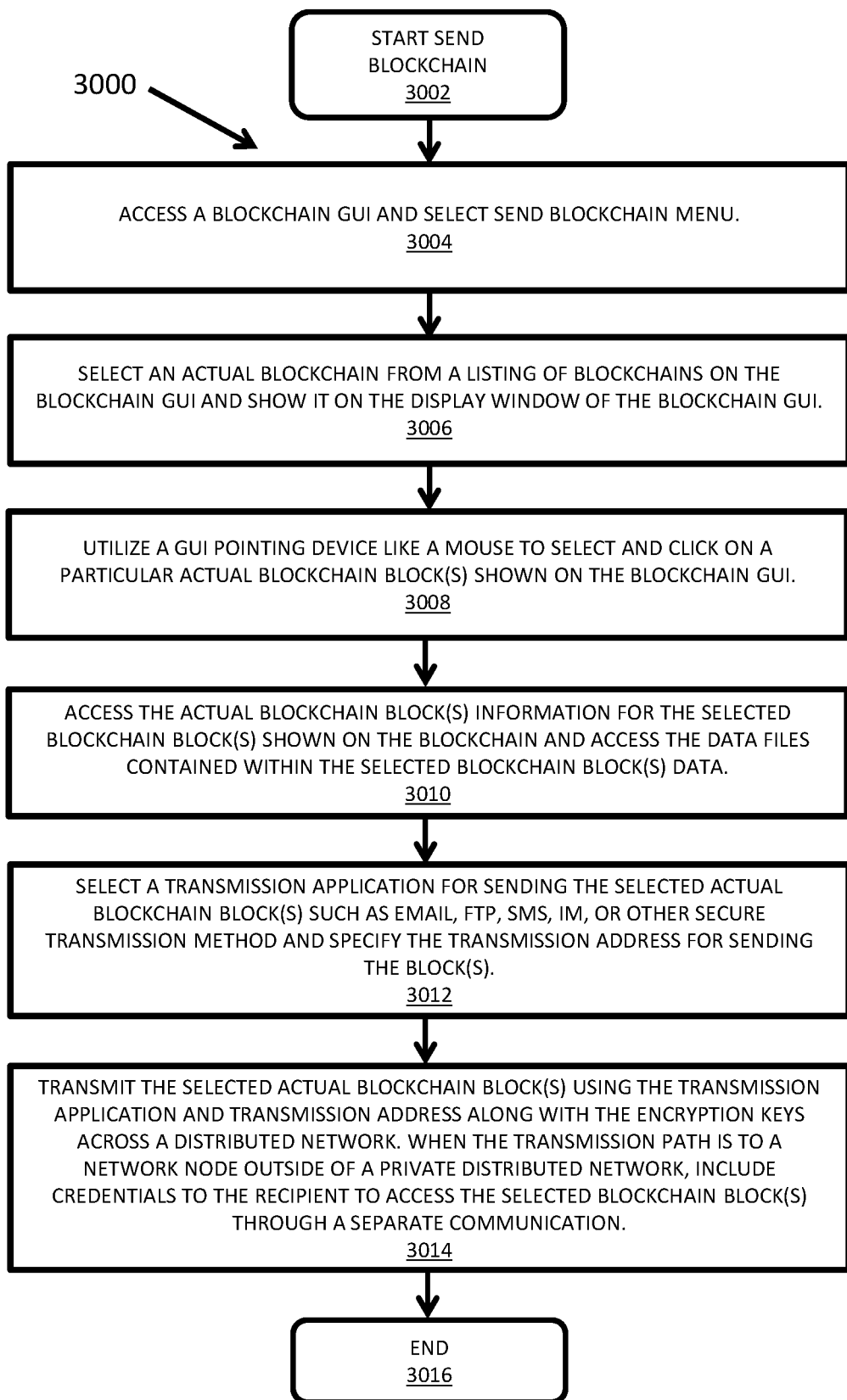
FIG. 13 illustrates a flowchart depicting a process for sending blockchain blocks to a recipient through the use of the Graphical User Interface (GUI) of the blockchain application.

The computer blockchain application also grants users the ability to access and view any stored blockchain from a listing of blockchains within the GUI 22 with GUI button 24. The user may then view and access all of the files 18 stored within that blockchain. Alternatively, the user may then view a selected blockchain on the GUI 22 of the computer blockchain application and select to view the files 18 stored within individual blockchain blocks by using the mouse 20 to select an individual blockchain block on the GUI 22. FIGS. 9-11 detail the process and functionality of viewing and accessing files after they have been added to a blockchain. GUI button 28 allows a user to send one or more files or blockchain blocks to a third party for review through the computer blockchain application, such as sending the blockchain block containing all of the tax records to their accountant. This transmission of the blockchain block may include credentials in order to access the files contained within the blockchain block. FIGS. 12 and 13 detail the process of sending one or more blockchain blocks to a third party. When a blockchain block is added to a blockchain, that blockchain block and the files it contains become a permanent part of that blockchain record. Thus, it is desirable to have the virtual blockchain organizational tool 31 in which a user can drop files into selected virtual blockchain blocks 32, 34, or 36 and have the flexibility to move them around and organize them in various configurations within blockchain blocks 32, 34, or 36 without permanently attaching them to the blockchain record until the user is satisfied with the organization and arrangement. While a user may add files 18 to the virtual blockchain 31, the user may remove those files from virtual blockchain as well prior to activating GUI button 38 that activates the process of forming the real actual blockchain blocks 56, 58, and 60 that are formed from virtual blockchain blocks 32, 34, and 36.

Figure 2:
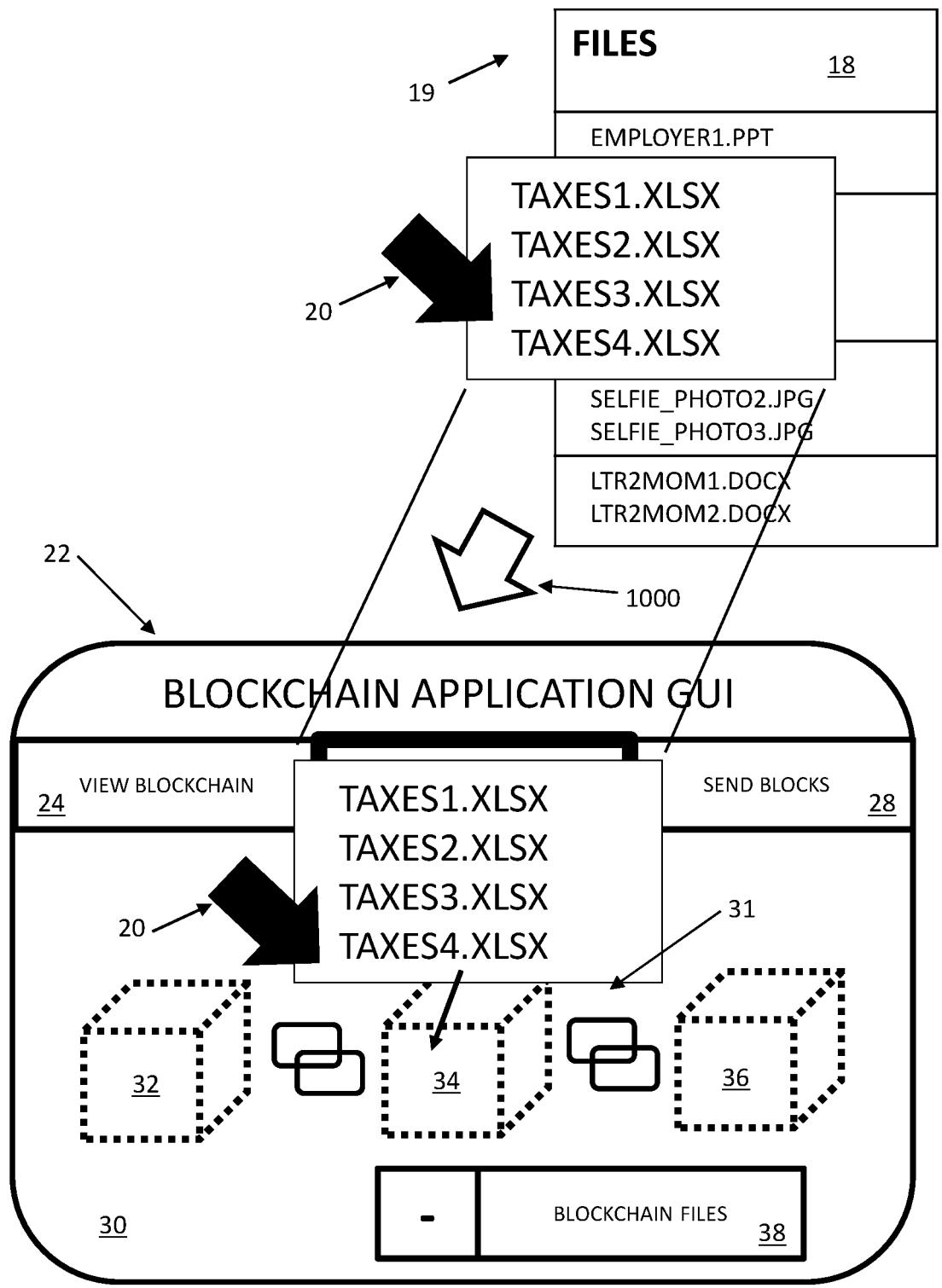
FIG. 2 depicts a process of using a Graphical User Interface (GUI) pointing device to select a file or group of files from a file menu and dragging and dropping them onto a virtual blockchain block shown within the GUI of the blockchain application.

FIG. 2 depicts a process of using a Graphical User Interface (GUI) pointing device 12 directing a pointer 20 to select a file 18 or group of files 18 from a file menu 19 and drag and drop them onto a virtual blockchain block 34 shown within the GUI 22 of the blockchain application. Files 18 may be shown on any type of GUI display for a file manager 19. For example, file manager 19 may show files 18 as a table, as a grid of icons, as a table of icons, or the like. Files 18 as depicted as being shown within a GUI file manager table 19 that lists files by file type. File manager 19 gives users the ability to sort files 18 by name, by type, by size, by saved by date, and other file parameters. Files 18 include common user application files such as files from word processors, presentation applications, image files, and spreadsheet files. Files 18 may include any type of data file format such as executable files, media files, video files, music files, text files, message files, email files, financial records, medical records, tax records, telephone records, and data files. Pointer 20 is directed by mouse 12 to select one or more files 18 from the file manager table 19. Through process 1000 shown in FIG. 8, pointer 20 selects one or more files 18 from the file manager table 19 and drags and drops them onto any desired virtual blockchain block that appears on GUI 22, which is virtual blockchain block 34 in this example. In this example, pointer 20 selected four tax EXCEL® spreadsheet records: taxes1.xslx; taxes2.xslx; taxes3.xslx; and taxes4.xslx; and dragged and dropped them as a group on virtual blockchain block 34. Process 1000 is symbolized on FIG. 2 by an arrow showing the directional movement of the selected group of tax spreadsheet files from the file manager GUI 19 to the virtual blockchain block 34. Once files 18 are dragged and dropped onto virtual blockchain block 34, metadata of the dragged and dropped files is associated with virtual blockchain block 34 indicating that those selected tax files will be associated and stored within that blockchain block when it is converted into an actual real blockchain block through process 1000. Once files 18 has been dragged and dropped onto virtual blockchain block 34, the user may use pointer 20 to move one or more of those files 18 from virtual blockchain block 34 to virtual blockchain block 32 or 36. The user may select and move files 18 onto any virtual blockchain block 32, 34, or 36 subject to rules discussed in FIG. 3. The user can move files 18 from one virtual blockchain block to any other virtual blockchain block subject to rules discussed in FIG. 3. The user may continue to selectively move and organize files 18 amongst the virtual blockchain blocks 32, 34, or 36 shown in GUI 22 until such time as GUI button 38 is selected that institutes the process of converting the virtual blockchain 31 into an actual real blockchain 50. Once GUI button 38 is selected, the process of blockchaining the files contained within virtual blockchain 31 to blockchain 50 is triggered automatically. When the user moves files 18 amongst virtual blockchain blocks, the metadata identifying those files are then associated with the new virtual blockchain blocks to which the files 18 have been moved to. Once the user selects button 38 to implement the process of converting the virtual blockchain 31 to an actual real blockchain 50, then the association of metadata for the files 18 is frozen with respect to the particular virtual blockchain blocks 32, 34, or 36 of blockchain 31. In this example, GUI 22 of the blockchain application is a foreground application when it is in use. The display of virtual blockchain 31 having virtual blockchain blocks 32, 34, and 36 is also a foreground process of the blockchain application. The dragging and dropping of file 18 from file manager table 19 onto one of the selected virtual blockchain blocks 32, 34, or 36 is a foreground process. In multiprocessing systems, the process that is currently accepting input from the keyboard or other input device like pointing device 12 is called a foreground process. Foreground refers to a task, process, application, or window on an operating system that a user is currently using. For example, when GUI 22 is the top most window within display 14, it is considered the active foreground application.

Figure 3:
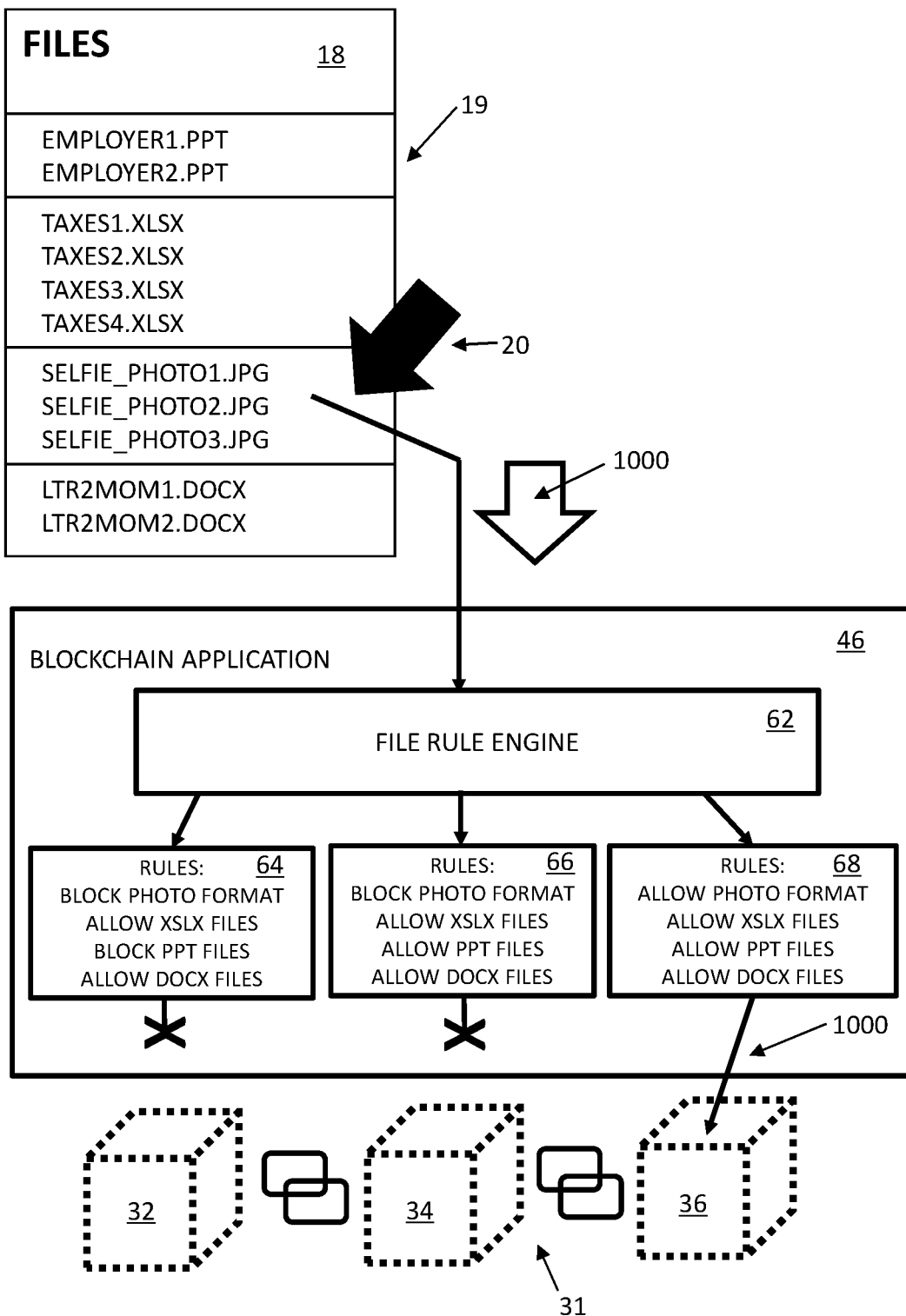
FIG. 3 illustrates the application of rules contained within the blockchain application within a file rule engine regulating the types of files that may be added to each virtual blockchain block.

FIG. 3 illustrates the application of rules contained within the blockchain application by a file rule engine 62 regulating the types of files 18 that may be added to each virtual blockchain block 32, 34, or 36 of virtual blockchain 31. There may be no restriction on which files 18 may be added to which virtual blockchain blocks form virtual blockchain 31. However, it may be desirable to restrict which type of files may be added to which virtual blockchain blocks form virtual blockchain 31 through the use of rules. Process 1000 of adding files 18 to a blockchain through the use of a GUI 22 and a virtual blockchain organizational tool includes the use of rules that may restrict which files 18 can be added to which virtual blockchain blocks based on any specified attribute of the file 18 such as file type, file size, file metadata, file hashtags, the application associated with the file, or file name. For example, certain files may have a file name extension associating that file with a particular software application, such as .doc for a word processor application. Blockchain application 46, that includes GUI 22, also includes a file rule base engine 62. File rule engine 62 is a set of rules specifying which files 18 can be associated with which virtual blockchain blocks 32, 34, or 36 of virtual blockchain 31. Rules may be set based on any specified attribute of the file 18 such as file type, file size, file metadata, the application associated with the file, or file name. These rules may be stored in a database on storage system 76 shown in FIG. 7. Rules are specified by a user through GUI 22 for each virtual blockchain block 32, 34, and 36. In this example, rule 64 has been created for virtual blockchain block 32, rule 66 has been created for virtual blockchain block 34, and rule 68 has been created for virtual blockchain block 36. Rule 64 states that EXCEL® spreadsheet file formats and WORD™ word processing file formats are allowed, but files having a photo image format or a POWERPOINT® file format are blocked. Rule 66 also blocks files having a photo format. Thus, the files 18 selfie_photo1.jpg, selfie_photo2.jpg, and selfie_photo3.jpg presently selected by pointer 20 cannot be added to virtual blockchain blocks 32 or 34 due to the application of rules 64 and 66 by the file rule base engine 62 contained within blockchain application 46. However, rule 68 does allow files of a photo format to be added to virtual blockchain block 36. Thus, the files 18 selfie_photo1.jpg, selfie_photo2.jpg, and selfie_photo3.jpg presently selected by pointer 20 from file manager table 19 can be added to virtual blockchain block 36 through process 1000 as it is permitted by the application of rule 68 by file rule base engine 62. As a result, metadata identifying the files 18 selfie_photo1.jpg, selfie_photo2.jpg, and selfie_photo3.jpg is associated with virtual blockchain block 36. Thus, when virtual blockchain block 36 is converted to an actual real blockchain block, the organization of the files 18 selfie_photo1.jpg, selfie_photo2.jpg, and selfie_photo3.jpg within that blockchain block is preserved by adding those files to that blockchain block as data. The "X" symbols after rules 64 and 66 indicate that the rules blocked the addition of the photo format files 18 to virtual blockchain blocks 32 and 34. The arrow from rule 68 to virtual blockchain block 36 indicates that the application of rule 68 to the .jpg files 18 selected by pointer 20 may be added to virtual blockchain block 36 through process 1000. The processes performed by file rules engine 62 are foreground processes that directly control the ability of the user to drag and drop files onto virtual blockchain 31 while the user is performing the dragging and dropping.

Figure 4:
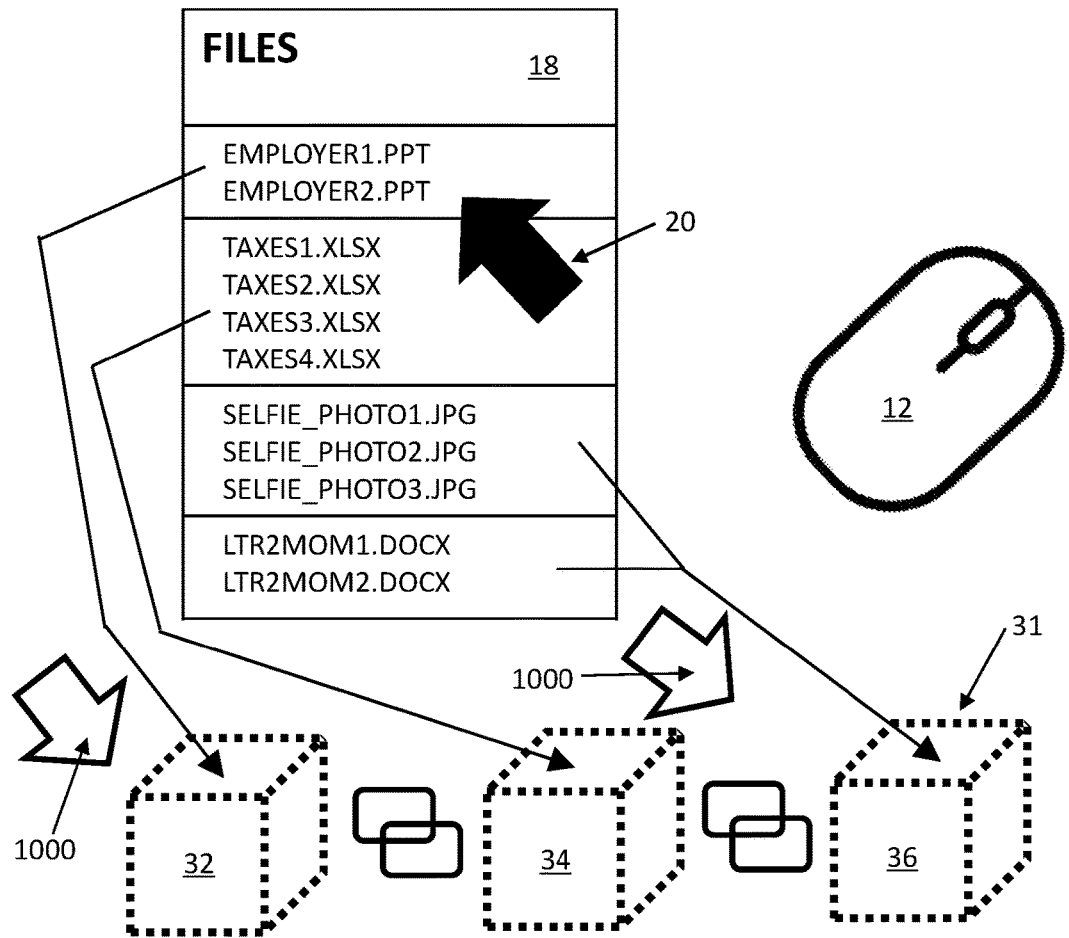
FIG. 4 shows the outcome of performing multiple drag and drop operations with a Graphical User Interface (GUI) pointing device onto multiple different virtual blockchain blocks along with tables showing the metadata that is added to each virtual blockchain block.

FIG. 4 shows the outcome of performing multiple drag and drop operations with a Graphical User Interface (GUI) pointing device 12 and pointer 20 onto multiple different virtual blockchain blocks 32, 34, and 36 along with tables showing the metadata that is added to each virtual blockchain block 32, 34, and 36. The file manager table 19 at the top of FIG. 4 illustrates eleven separate files 18: two POWERPOINT® files, four EXCEL® files, three .JPG image files, and two WORD™ files. All eleven of these files 18 in the file manager GUI table 19 have been distributed into virtual blockchain blocks 32, 34, and 36 through the use of mouse 12 and pointer 20 by process 1000. The files employer1.ppt and employer2.ppt have been dragged and dropped by process 1000 into virtual blockchain block 32. The files taxes1.xlsx, taxes2.xlsx, taxes3.xlsx, and taxes4.xlsx have been dragged and dropped by process 1000 into virtual blockchain block 34. The files selfie_photo1.jpg, selfie_photo2.jpg, selfie_photo3.jpg, ltr2mom1.docx, and ltr2mom2.docx have been dragged and dropped by process 1000 into virtual blockchain block 36. This association of files 18 with virtual blockchain 31 is determined by the user selections and restrictions specified by the user through rules. The use of a drag and drop process to associate files 18 with a particular virtual blockchain block 32, 34, or 36 is merely exemplary. Any process using a pointing device 12 and a GUI pointer 20 may be used to associate files 18 with a particular virtual blockchain block 32, 34, and 36. In the process 1000 of associating files 18 with virtual blockchain blocks 32, 34, and 36, the association is created by adding metadata identifying each file 18 with the specific virtual blockchain block to which the file 18 is added to. This metadata is typically the file metadata icon that is selected, dragged, and dropped onto the virtual blockchain blocks 32, 34, and 36. Table 40 illustrates the data within virtual blockchain block 32. This data includes a header identifying virtual blockchain block 32. This data also includes metadata identifying the files 18 that have been added to virtual blockchain block 32, which in this example is the name of each file 18. This metadata is used to locate and access the files 18 to include the full file within the actual real blockchain block when that is created through process 1000. Table 42 illustrates the data within virtual blockchain block 34. This data includes a header identifying virtual blockchain block 34. This data also includes metadata identifying the files 18 that have been added to virtual blockchain block 34, which in this example is the name of each file 18. Table 44 illustrates the data within virtual blockchain block 36. This data includes a header identifying virtual blockchain block 36. This data also includes metadata identifying the files 18 that have been added to virtual blockchain block 36, which in this example is the name of each file 18. Note that tables 40, 42, and 44 need not contain the entire data for each file 18 in this example, but just the metadata for each file 18. Also, each virtual blockchain block does not contain interlinking hashes between them as a conventional blockchain would. The files 18 will form the data for the actual real blockchain, which include hashes based on the files 18 and preceding actual real blockchain blocks. The lack of the data for the entire files 18 and lack of hashes in the virtual blockchain blocks is desirable for the virtual blockchain as it is only an organizational tool for determining which files 18 will be associated with which virtual blockchain blocks.

FIG. 5 illustrates a process 1000 for converting virtual blockchain blocks 32, 34, and 36 into actual real blockchain blocks 56, 58. And 60 that are attached to an existing blockchain 50. FIGS. 2-5 graphically illustrate the process of adding files 18 to an actual blockchain, which is shown within flowchart 1000. In FIG. 5, the user has completed the process of selecting, distributing, and organizing files 18 from a file manager to virtual blockchain blocks 32, 34, and 36. With the completion of organizing files 18 within virtual blockchain 31, the user selects the GUI button 38 to automatically convert the virtual blockchain 31 into new actual real blockchain blocks 56, 58, and 60, thereby blockchaining the files. GUI button 38 is selected and activated by pointer 20 and device 12. Once GUI button 38 has been selected and activated, process 1000 occurs automatically and the virtual blockchain blocks 32, 34, and 36 are sent through blockchain application 46 to add them to actual real blockchain 50. This process 1000 of converting the virtual blockchain blocks to new actual real blockchain blocks 56, 58, and 60 begins by selecting which actual blockchain 50 to which the virtual blockchain blocks 32, 34, and 36 are to be added. If no actual real blockchain 50 exists and virtual blockchain block 32 is to be the genesis block of a new blockchain, then no old blockchain is selected. Next, the blockchain application 46 interrogates each table 40, 42, and 44 to access the files 18 associated with each virtual blockchain block based on the metadata for each file 18 within the tables 40, 42, and 44. The blockchain application 46 combines all of the files 18 for each blockchain block into one single combined file in order to calculate a hash digest. The blockchain application 46 accesses blockchain 50 from a storage device 48. Prior to the addition of virtual blockchain blocks 32, 34, and 36, blockchain 50 includes blockchain blocks 52 and 54 only. Blockchain application 46 converts virtual blockchain block 32 into new actual real blockchain block 56. New actual real blockchain block 56 includes the all data from the files 18 associated with virtual blockchain block 32 as data. These files are the four spreadsheet files identified within table 40. Blockchain block 56 also includes a hash digest from blockchain block 54 to link it to blockchain 50 as well as a hash digest of the data within blockchain block 56. Blockchain application 46 converts virtual blockchain block 34 into new actual real blockchain block 58. New actual real blockchain block 58 includes all data from the files 18 associated with virtual blockchain block 34 as data. These files are the two presentation files identified within table 42. Blockchain block 58 also includes a hash digest from blockchain block 56 to link it to blockchain 50 as well as a hash digest of the data within blockchain block 58. Blockchain application 46 converts virtual blockchain block 36 into new actual real blockchain block 60. New actual real blockchain block 69 includes all data from the files 18 associated with virtual blockchain block 36 as data. These files are the three image files and to word processing files identified within table 44. Blockchain block 60 also includes a hash digest from blockchain block 58 to link it to blockchain 50 as well as a hash digest of the data within blockchain block 60. Through this process 1000, virtual blockchain blocks 32, 34, and 36 are converted to new actual real blockchain blocks 56, 58, and 60 added as a contiguous part of blockchain 50. In FIG. 5, the process of converting virtual blockchain 31 into actual real blockchain blocks in blockchain 50 is triggered manually by the user with GUI button 38. Once GUI button 28 has been manually activated, the process of converting virtual blockchain 31 into actual real blockchain blocks appended to real blockchain 50 occurs automatically. Further, the process of converting virtual blockchain 31 into actual real blockchain blocks appended to real blockchain 50 is a background process or task. The process of converting virtual blockchain 31 into actual real blockchain blocks appended to real blockchain 50 is a child process of triggering GUI button 38. A background process or background task is a computer process that runs behind the scenes and without user intervention. Typical tasks for these processes include logging, system monitoring, scheduling, and user notification. The background process usually is a child process created by a control process for processing a computing task. After creation, the child process will run on its own, performing the task independent of the control process, freeing the control process of performing that task. On a MICROSOFT® WINDOWS® system, a background process is either a computer program that does not create a user interface, or a WINDOWS® service.

FIG. 6 illustrates a set of tables showing what data and metadata is contained within each blockchain block 56, 58, and 60 that has been converted from the virtual blockchain blocks 32, 34, and 36 shown in FIG. 4. Blockchain blocks 56, 58, and 60 are a part of blockchain 50. Blockchain block 56 includes a header, it includes blockchain data formed of the two PowerPoint® files, and a hash digest of blockchain block 54 and a hash digest of the current blockchain block 56. Blockchain block 58 includes a header, it includes blockchain data formed of the two presentation files, and a hash digest of blockchain block 56 and a hash digest of the current blockchain block 58. Blockchain block 60 includes a header, it includes blockchain data formed of the three image files and two-word processing files, and a hash digest of blockchain block 58 and a hash digest of the current blockchain block 60. The header for each blockchain block 56, 58, and 60 includes metadata on the blockchain blocks which mirrors the organization and structure of the virtual blockchain 31 having virtual blockchain blocks 32, 34, and 36.

Figure 7:
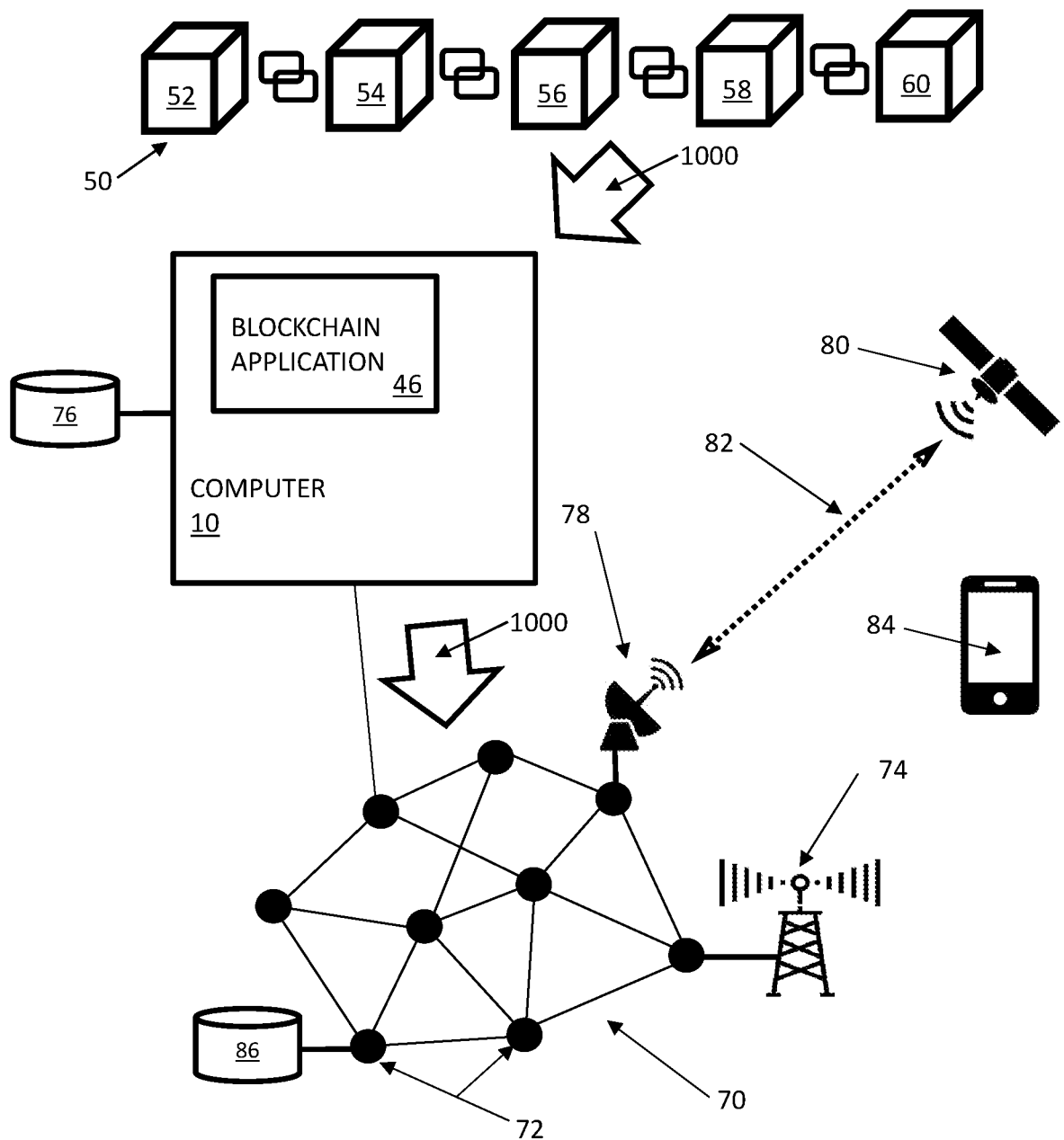
FIG. 7 illustrates a process of distributing the blockchain with the new actual blockchain blocks onto a distributed network, which may be a subscription distributed network or a private distributed network.

FIG. 7 illustrates a process of distributing the blockchain 50 with the new blockchain blocks 56, 58, and 60 onto a distributed network 70, which may be a subscription distributed network or a private distributed network. Blockchain 50 is an actual real blockchain block where each block 52, 54, 56, 58, and 60 is linked together with interlinking hash digests. In process 1000, blockchain application 46 distributes blockchain 50 onto distributed network 70. Distributed network 70 is formed of a plurality of nodes 72. Nodes 72 may be connected to storage systems 86, which may be cloud storage or archival storage. Nodes 72 may be connected to wireless communication antenna 74 supporting WiFi or cellular communications that may bidirectionally communicate with a cell phone 84. Nodes 72 may also be in bidirectional communication with a satellite antenna 78 that communicates bidirectionally with satellite 80 via link 82. Any of the nodes 72, cloud storage device 86, cellular phone 84, satellite 80, or external storage 76 may store blockchain 50 or the new blockchain blocks 56, 58, and 60. As shown in FIG. 7, blockchain application 46 executes on computer 10. Computer 10 is connected to external storage device 76, which can store blockchain 50. Blockchain 50 is redundantly stored on multiple nodes 72 or devices 76, 86, 84, or 80. This redundant storage enables to prevent tampering with blockchain 50. While a hacker may successfully compromise one or more copies of blockchain 50, it is unlikely a hacker could successfully compromise a majority of copies of blockchain 50 stored across distributed network 70. When blockchain 50 is accessed by blockchain application 46, distributed network 70 is polled to determine if the accessed copy is stored by a majority of nodes on distributed network 70. If the accessed copy matches a majority of copies of the same blockchain stored on distributed network 70, then the accessed copy is determined to be legitimate. If the accessed copy does not match a majority of copies of the same blockchain stored on distributed network 70, then the accessed copy is determined to be illegitimate. The process of distributing and storing blockchain 50 onto distributed network 70 is one that is triggered automatically by the activation of GUI button 38 by the user. The process of distributing and storing blockchain 50 onto distributed network 70 is a child process created by the activation of GUI button 38 by the user. The process of distributing and storing blockchain 50 onto distributed network 70 is a background process.

Figure 8:
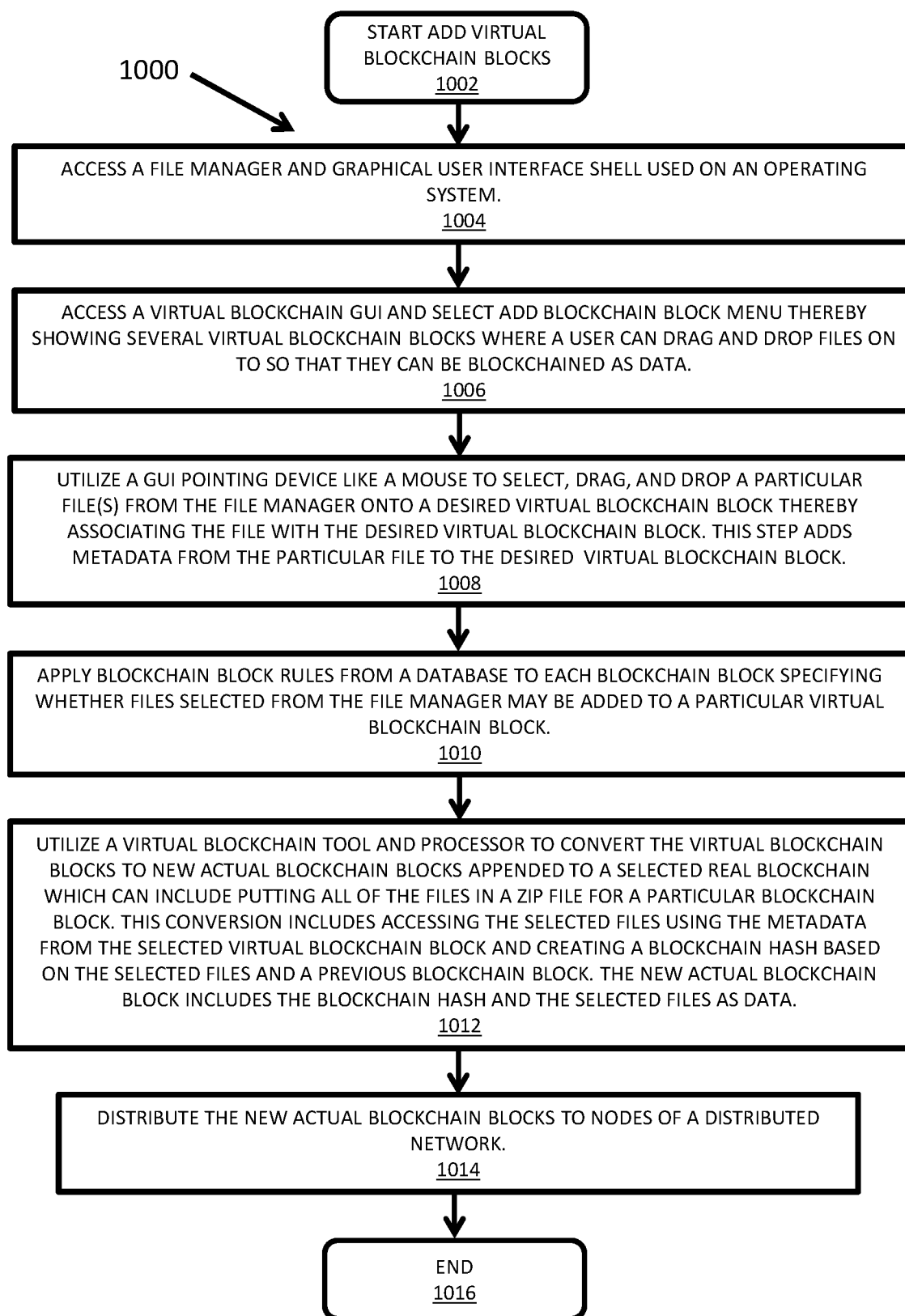
FIG. 8 illustrates a flowchart depicting a process for adding files to an actual blockchain through the use of a virtual blockchain displayed within a Graphical User Interface (GUI) of a blockchain application.

FIG. 8 illustrates a flowchart 1000 depicting a process 1000 for adding files 18 to a blockchain 50 through the use of a virtual blockchain 31 displayed within a Graphical User Interface (GUI) 22 of a blockchain application 46. Flowchart 1000 depicts the process of adding files 18 to a blockchain 50 through a virtual blockchain 31. The process 1000 of adding files 18 to a blockchain 50 through the use of a GUI virtual blockchain organization tool 1002 begins with START 1002. The next step 1004 of process 1000 is to access a file manager GUI 16 and 19 to gain access to files 18 that a user can select from to add to a GUI virtual blockchain organizational tool 31. In step 1006, the user accesses GUI virtual blockchain organizational tool 31. Still in step 1006, the user selects the option to add new files to new blockchain blocks from a menu, which thereby causes blockchain application 46 to display the virtual blockchain 31 on the display window of GUI 22 where a user can drag and drop files onto particular virtual blockchain blocks 32, 34, and 36 so that the files 18 can be added to actual real blockchain 50 as blockchained data as shown in FIG. 2. In step 1008, the user utilizes a GUI pointing device 12, like a mouse, to direct a GUI pointer 20 to select, drag, and drop a particular file or files 18 from the file manager table 19 onto a desired virtual blockchain block 32, 34, or 36, thereby associating metadata or that file or files 18 with the desired blockchain block 32, 34, or 36 as shown in FIGS. 2-4. Step 1008 adds metadata from the selected file or files 18 to the selected virtual blockchain block 32, 34, or 36, which forms the association of that file or files 18 to the selected virtual blockchain block 32, 34, or 36. In step 1010, blockchain application 46 applies rules from a database contained in storage device 76 to the association of files 18 to virtual blockchain blocks 32, 34, and 36 as shown in FIG. 3. These rules specify what files are allowed or not allowed to be associated with a virtual blockchain block 32, 34, or 36 based upon any attribute of the file 18 such as file type, file metadata, file size, the computer application associated with the file, file name, or any other file attribute. These rules may be default rules or specified by a user as a safeguard to help ensure that the user drag and drop actions match their desired organization of files 18 within virtual blockchain 31. In step 1012, the blockchain application 46 converts the virtual blockchain 31 to an actual real blockchain as shown in FIG. 5. The process of blockchaining the data from the files 18 onto blockchain 50 occurs automatically when the user presses the GUI button 38. Blockchain application 46 utilizes the user selections of which files 18 are associated with which virtual blockchain blocks 32, 34, and 36 along with a processor to convert the virtual blockchain blocks 32, 34, and 36 to new real blockchain blocks 56, 58, and 60 that are appended to real blockchain 50. If more than one file 18 is added to a single virtual blockchain block, the multiple files may be combined into a single file which can include compression, such as with a ZIP file. The process of converting the virtual blockchain blocks to actual real blockchain blocks involves using the metadata identifying the files 18 associated with each virtual blockchain block 32, 34, and 36. Blockchain application 46 uses the metadata to access the actual files 18 for the process of forming real blockchain blocks 56, 58, and 60. Blockchain application 46 accesses the real blockchain 50 from the storage system 76, which at this point includes blocks 52 and 54. Blockchain application 46 accesses hash digests from prior blockchain blocks and includes them in the new blockchain blocks 56, 58, and 60 as they are formed and also generates hash digests of the data within the new blockchain blocks, which includes the file 18, or combined files 18 that are stored within the new blockchain blocks 56, 58, and 60. The file or files 18 associated with each virtual blockchain block 32, 34, and 36 through metadata are included as data in their entirety within new blockchain blocks 56, 58, and 60. The resulting blockchain blocks 56, 58, and 60 are shown in FIG. 6. In step 1014, blockchain application 46 distributes the new blockchain blocks 56, 58, and 60 onto the distributed network 70 shown in FIG. 7 for storage. The process 1000 ENDS in step 1016. Steps 1004, 1006, 1008, and 1010 are foreground processes. Steps 1012 and 1014 are background processes.

FIG. 9 depicts the Graphical User Interface (GUI) 22 of the blockchain application 46 in which the viewing of a blockchain option has been selected via GUI button 24 and a particular blockchain 50 is chosen for viewing from a dropdown menu listing of blockchains available for viewing thereby allowing the viewing of files 18 stored within the blockchain blocks 52-60. GUI button 24 is shown in BOLD to signify that it has been selected by pointer 20. Once a user adds files 18 to a blockchain 50 as discussed in FIGS. 1-8, a user will want to view and access those files 18 for use. FIGS. 9-11 detail how a user may interact with a blockchain 50 storing files 18 in order to view and access those files 18. The process begins with using pointer 20 to activate GUI button 24 in order to view blockchain 50 and access files 18. With selecting GUI button 24, a further dropdown menu 25 appears that provides a listing of multiple blockchains 50 that are accessible from blockchain application 46 through GUI 22. Menu 25 lists three blockchains 50 in this example, but any number of blockchains 50 may be shown. Further, blockchains 50 may be displayed in any manner in conjunction with a file manager. Here, pointer 20 has selected personalblockchain.blk 50. The file name extension .blk is an abbreviation for blockchain to identify the file as a blockchain file. Once blockchain personalblockchain.blk 50 has been selected, blockchain application 46 accesses blockchain 50 from storage device 76 and displays it on GUI 22. Note that because blockchain 50 is an actual real blockchain, it is shown in solid lines on GUI 22, not dashed lines as are used for virtual blockchain 31. Once blockchain 50 is shown on GUI 22, the user may use pointer 20 to select any of the blockchain blocks 52-60 with a mouse click in order to view the files 18 that are contained within that selected blockchain block 52-60. Selecting a particular blockchain block 58 produces a GUI table 59 that may be shown on display 14. GUI table 59 provides a listing of all of the information and data within blockchain block 58. This information and data includes the header of blockchain block 58, metadata on blockchain block 58, all of the data from the entire files employer1.ppt and employer2.ppt, the hash digest from blockchain block 56, and the hash digest from blockchain block 58, and an optional encryption key if blockchain block 58 has the data encrypted within it. The method of generating table 59 with data from blockchain block 58 is given by process 2000 shown in FIG. 11. With process 2000, a user can then access the files 18 employer1.ppt and employer2.ppt, represented by separate boxes, and open them using a POWERPOINT® software application.

FIG. 10 depicts the Graphical User Interface (GUI) 22 of the blockchain application 46 in which the viewing of a blockchain 50 option has been selected and a menu option 25 to show all files 18 in the blockchain 50. In FIG. 10, a further option to view files 18 from blockchain 50 is provided in menu 25 in the form of menu option 25 to view all files 27. When the menu option 27 to view all files 18 is selected with pointer 20, process 2000 generates GUI table 29 shown on display 14 that lists all of the files contained within all of the blockchain blocks 52-60. Using pointer 20, a user can select one of the files 18 from the GUI table 29 in order to view it and access it with an associated software application. Here, pointer 20 has selected the two files empoyer2.ppt and employer2.ppt from GUI table 29 to access them as separate files, represented by boxes, in order to open it with the POWERPOINT® software application.

FIG. 11 illustrates a flowchart 2000 depicting a process 2000 for viewing files 18 stored within a blockchain 50 with the Graphical User Interface (GUI) 22 of the blockchain application 46. Process 2000 begins with START 2002. In step 2004, a user would access blockchain application 46 to bring up GUI 22 and select GUI button 24 with pointer 20 in order to access the functionality of the view blockchain menu 25. In step 2006, a user would select a particular blockchain 50 from a listing of blockchain on the blockchain menu GUI 25. Once a blockchain 50 has been selected, the blockchain application 46 creates a GUI representation of blockchain 50 to display on GUI 22. Blockchain application 46 generates this representation of blockchain 50 on GUI 22 by accessing the header, metadata, hash digests, and files 18 contained within blockchain 50. In the representation of the blockchain 50 shown on GUI 22, each blockchain block 52-60 includes metadata on the files contained within blockchain 50 in order to show which files are within the blockchain 50. However, the GUI representation of blockchain 50 does not contain the actual files 18. In step 2008, the user utilizes a GUI pointing device 12 to select and click on a particular blockchain block on GUI 22. In step 2010, based on the selection of a particular blockchain block by the user in step 2008, the blockchain application 46 accesses the blockchain block information metadata from the selected blockchain block shown on GUI 22. Once this information and metadata has been accessed, the blockchain application 46 displays that data files 18 in a GUI table 59 or 29 associated with that metadata from the blockchain 50 by getting the files 18 from blockchain 50. In step 2012, the user selects a particular file 18 from GUI table 59 or 29 to view and access. This selection causes the blockchain application 29 to extract the data file or files 18 from the selected blockchain blocks and uses any associated encryption keys or credentials to open the files for use by their respective software application. The process ENDS with step 2014. Steps 2004, 2006, 2008, and 2010 are foreground processes. Step 2012 is a background process.

FIG. 12 illustrates the Graphical User Interface (GUI) 22 of the blockchain application 46 in which the sending of blockchain blocks option 28 has been selected in which menu options 94 and 96 to select a transmission application 90 are displayed and allowing for the selection of which blockchain blocks 52-60 are to be sent through the use of the GUI pointing device 12 selecting blockchain blocks 52-60 from the blockchain 50 on the GUI 22. In FIG. 12, a user has selected the send blocks GUI button 28, which is correspondingly shown in BOLD. Once files 18 have been added to a blockchain 50, a user may want to share those files with someone else for use. For example, a user may be a taxpayer that needs to share files 18 with an accountant, or a doctor that needs to share files 18 with a patient or a hospital. The send blocks GUI menu button 28 allows a user to access a blockchain and send user selected blockchain blocks to a specified address. Under the send blocks GUI button 28, a dropdown menu 94 appears that allows a user to select a transmission application 94, such as a File Transfer Protocol, an email option, an instant messenger option, or any other communication option. With dropdown menu option 96, the user specifies an address or network node to which the user is sending the selected blockchain blocks. As shown in FIG. 12, the user selects menu options 94 and 96 using pointer 20. The user also selects specific blockchain blocks 52-60 to send with pointer 20 from GUI 22. Once the user has selected which blockchain blocks 52-60 to send with pointer 20 and has specified which transmission application and address to use for sending, blockchain application uses process 3000 to transmit the selected blockchain blocks to a remote user at a terminal 92. In FIG. 12, the user has selected blockchain block 56 that is then transmitted across distributed network 70 formed of nodes 72 to remote terminal 92. Blockchain application 46 runs on computer 10 where it interacts with transmission application 90. Blockchain application 46 may include cryptographic keys to secure blockchain block 56 prior to transmission and then send those keys to remote terminal 92 through a separate communication from the one transmitting blockchain block 56. With these keys, the user at the remote terminal 92 can then access and view the files within blockchain block 56. The process for selecting and sending blockchain block 56 from blockchain 50 to remote terminal 92 is detailed in flowchart 3000 shown in FIG. 13.

FIG. 13 illustrates a flowchart 3000 depicting a process for sending blockchain blocks 52-60 to a recipient 92 through the use of the Graphical User Interface (GUI) 22 of the blockchain application 46. The process begins with START in step 3002. In step 3004, the blockchain application 46 accesses a blockchain GUI 22 and displays a send blockchain menu 94 and 96 based upon user actions with pointer 22. In step 3006, a user selects a blockchain 50 from a listing of blockchains on the blockchain GUI 22 to display the blockchain 50 within the viewing window of GUI 22. In step 3008, the user utilizes a GUI pointing device 12 to direct pointer 20 to select and click on a particular blockchain block or blocks shown on the blockchain GUI 22 to designate those blocks for sending to a remote terminal 92. In step 3010, once the user has selected one or more GUI blockchain blocks from GUI 22 for transmission to a remote node or terminal, the blockchain application 96 accesses those selected blockchain blocks from the actual blockchain 50 and accesses the data files contained within them. In step 3012, the user selects a transmission application for sending the selected blockchain blocks such as a File Transfer Protocol, email, instant messenger, cloud file sharing application, or any other secure transmission application. In step 3012, the user also specifies information identifying the recipient, such as an email address, IP address, a cloud account address, or any other recipient identifying information. In step 3014, blockchain application 46 transmits the selected blockchain blocks using the transmission application and transmission address across a distributed network. The transmitted blockchain blocks may be encrypted with encryption keys being sent to the recipient through a separate communication. The transmitted blockchain blocks may also be secured requiring credentials. The selected blockchain blocks that have been transmitted are received by a recipient where the recipient can open and access the files contained within the transmitted blockchain blocks with the keys or credentials. The process ENDS with step 3016. Steps 3004, 3006, 3008, 3010, and 3012 are foreground processes. Step 3014 is a background process.

Figure 14:
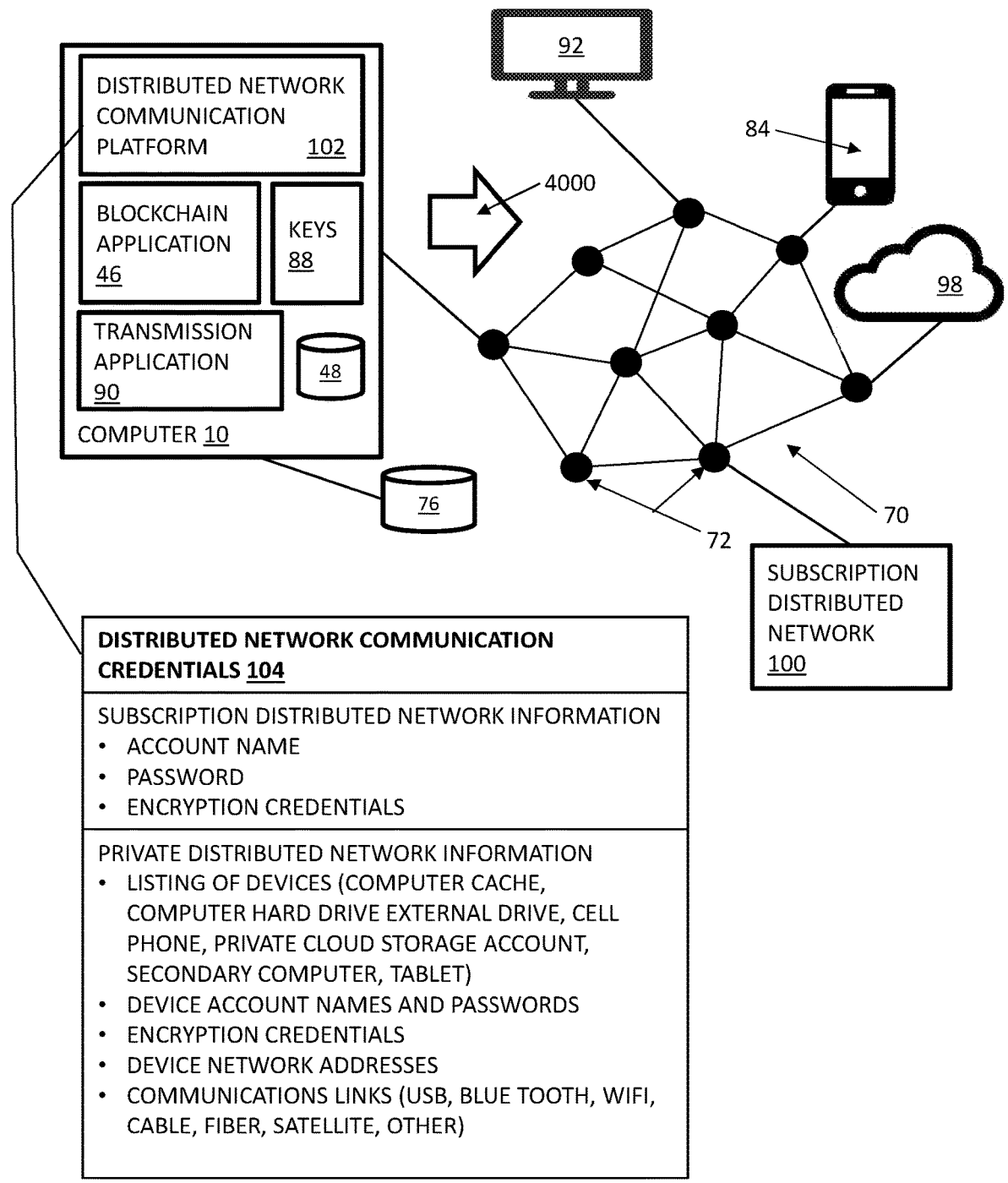
FIG. 14 illustrates a block diagram of the blockchain application running on a computer in communication with a distributed network, which may be a subscription distributed network or a private distributed network, in which distributed network communication credentials are required to distribute the blockchain onto the network.

FIG. 14 illustrates a block diagram of the blockchain application 46 running on a computer 10 in communication with a distributed network 70, which may be a subscription distributed network or a private distributed network, in which distributed network communication credentials are required to distribute the blockchain 50 onto the network 70. A block diagram of computer 10 is shown connected to distributed network 70. Computer 10 includes blockchain application 46 and a storage drive 48 for containing information such as blockchain 50 and files 18. Computer 10 also includes a distributed network communication platform 102 that includes the hardware for transmitting blockchain blocks to remote terminals 92, nodes 72, cloud storage 98, and cellular devices 84. Distributed network communications platform 102 communicates with transmission application 90 that includes File Transfer Protocol applications, email applications, instant messenger applications, cloud file distribution applications, and any other secure file transmission application. The transmitted blockchain blocks may be encrypted with keys that are stored in encryption key module 88. Computer 10 may be in communication with external drive 76 in which blockchains 50 are stored, files 18 are stored, encryption keys are stored, and any other information for blockchain application 46 is stored. Computer 10 distributes blockchain blocks 52-60 onto distributed network 70 via process 4000 shown in FIG. 15. Distributed network 70 includes a plurality of nodes 72. Distributed network 70 is in bidirectional communication with remote terminal 92, a cellular phone or tablet 84, a cloud-based storage system 98. Remote terminal 92, cellular phone 84, cloud-based storage 98, and external drive 76 may be combined into a private distributed network. Remote terminal 92, cellular phone 84, cloud-based storage 98, and external drive 76 may all be owned and controlled by an individual user and may be organized into an ad-hoc private distributed network upon which the user may store the blockchain 50 for storage. The storage of blockchain 50 on the ad-hoc private distributed network is desirable as all of the devices are owned and controlled by the user. Alternatively, distributed network 70 may be in communication with a subscription based distributed network 100 in which a user pays a subscription to store blockchain 50. Distributed network communication platform 102 includes a table of communications and credential information 104 in order to access and communicate with the private distributed network or the subscription based distributed network. The private distributed network information includes a listing of devices that are a part of the private distributed network such as computer cache, internal and external drives, cell phones, tablets, laptop computers, desktop computers, cloud storage accounts, etc. The private distributed network information also includes device account names and passwords, encryption credentials, device network addresses, and communications link information. The subscription based distributed network information includes credentials for accessing the account such as account name and password as well as encryption credentials. Through this system, the user has options as to what kind of distributed network they wish to distribute their blockchain information on for storage. Accessing blockchain information from either distributed network involves taking a poll of the nodes as to whether a majority of copies of the blockchain on the node match an accessed copy of the blockchain. If the accessed copy matches the majority of stored copies, the user is granted access to the file 18. If the accessed copy does not match the majority of stored copies, the user is not granted access to the file 18. FIG. 14 illustrates a background process.

Figure 15:
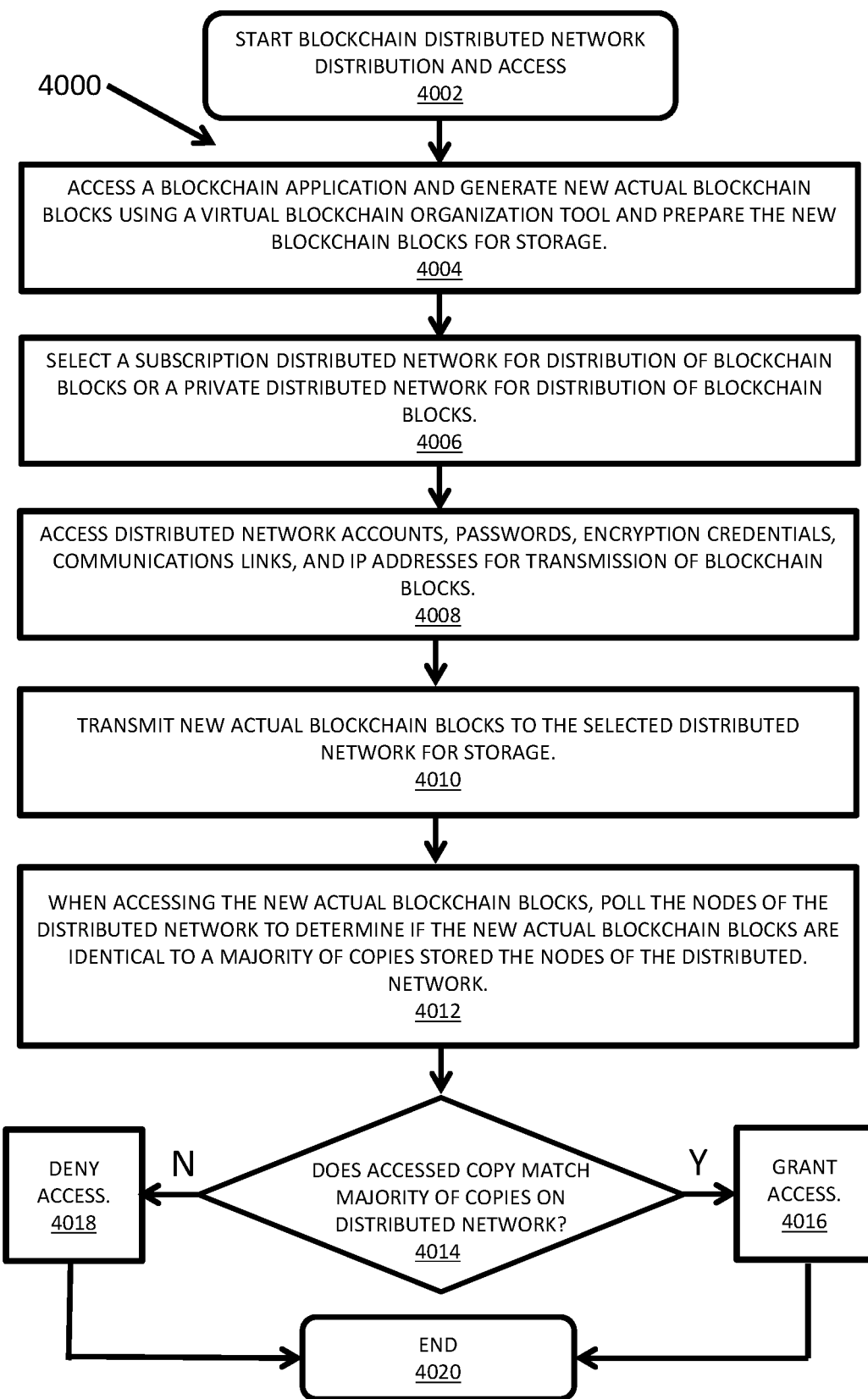
FIG. 15 illustrates a flowchart depicting a process for distributing blockchain blocks onto a distributed network and then accessing those blockchain blocks.

FIG. 15 illustrates a flowchart 4000 depicting a process 4000 for distributing blockchain blocks onto a distributed network 70 and then accessing those blockchain blocks. The process begins with START 4002. Steps 4004-4010 illustrate storing a blockchain onto a distributed network. Steps 4012-4016 illustrate accessing that same blockchain from the distributed network. In step 4004, a user accesses the blockchain application 46 and creates new blockchain blocks 56, 58, and 60 using the virtual blockchain organizational tool 31 and prepares those new blockchain blocks 56, 58, and 60 for transmission to a distributed network for storage redundantly across multiple nodes. In step 4006, the user selects whether to store the new blockchain blocks 56, 58, and 60 on to a subscription based distributed network or a private distributed network. In step 4008, the blockchain application accesses the distributed network information and credentials from table 104 to access either distributed network and its devices. The private distributed network information includes a listing of devices that are a part of the private distributed network such as computer cache, internal and external drives, cell phones, tablets, laptop computers, desktop computers, cloud storage accounts, etc. The private distributed network information also includes device account names and passwords, encryption credentials, device network addresses, and communications link information. The subscription based distributed network information includes credentials for accessing the account such as account name and password as well as encryption credentials. Through this system, the user has options as to what kind of distributed network they wish to distribute their blockchain information on for storage. In step 4010, blockchain application 46 transmits the new blockchain blocks 56, 58, and 60 onto the selected distributed network for storage. In step 4012, a user decides to access the store blockchain from the distributed network. When accessing the new blockchain blocks 56, 58, and 60 from the distributed network, blockchain application 46 utilizes the distributed network information and credentials from table 104 to gain access to those networks and the stored blockchain blocks. The blockchain application 46 then takes a poll of the copies of the blockchain stored on the various nodes of the distributed network to determine which copy of the blockchain blocks is stored by a majority of nodes within the distributed network in step 4014. If the copy of the blockchain accessed by the blockchain network 46 matches the version stored by a majority of nodes, then the accessed version is permissible and the user is granted access in step 4016. If the copy of the blockchain accessed by the blockchain network 46 does not match the version stored by a majority of nodes, then the accessed version is permissible and the user is not granted access in step 4018. The process ENDS in step 4020. Steps 4004 and 4006 are foreground processes. Steps 4008-4018 are background processes.

FIG. 16 illustrates a block diagram of a computer system 10 that runs the blockchain application 46. Computer 10 has a central processing unit "CPU" 114, which is in communication with one or more hash ASIC cores 116, Bluetooth interface 118, display driver 120, and RAM (Random Access Memory) 112. Bluetooth interface 118 has Bluetooth antenna 108 which can pick up input from keyboard 106 and mouse 12 via their Bluetooth antennas 108. USB interface 118 and HDD (Hard Disk Drive) 48 are also each attached to CPU 114. Display driver 120 controls display 14. Hash ASIC cores 116 compute hash digests on data for blockchain blocks. HDD 48 could alternatively be a solid-state drive (SDD), a tape drive, or an optical disc drive.

Figure 17:
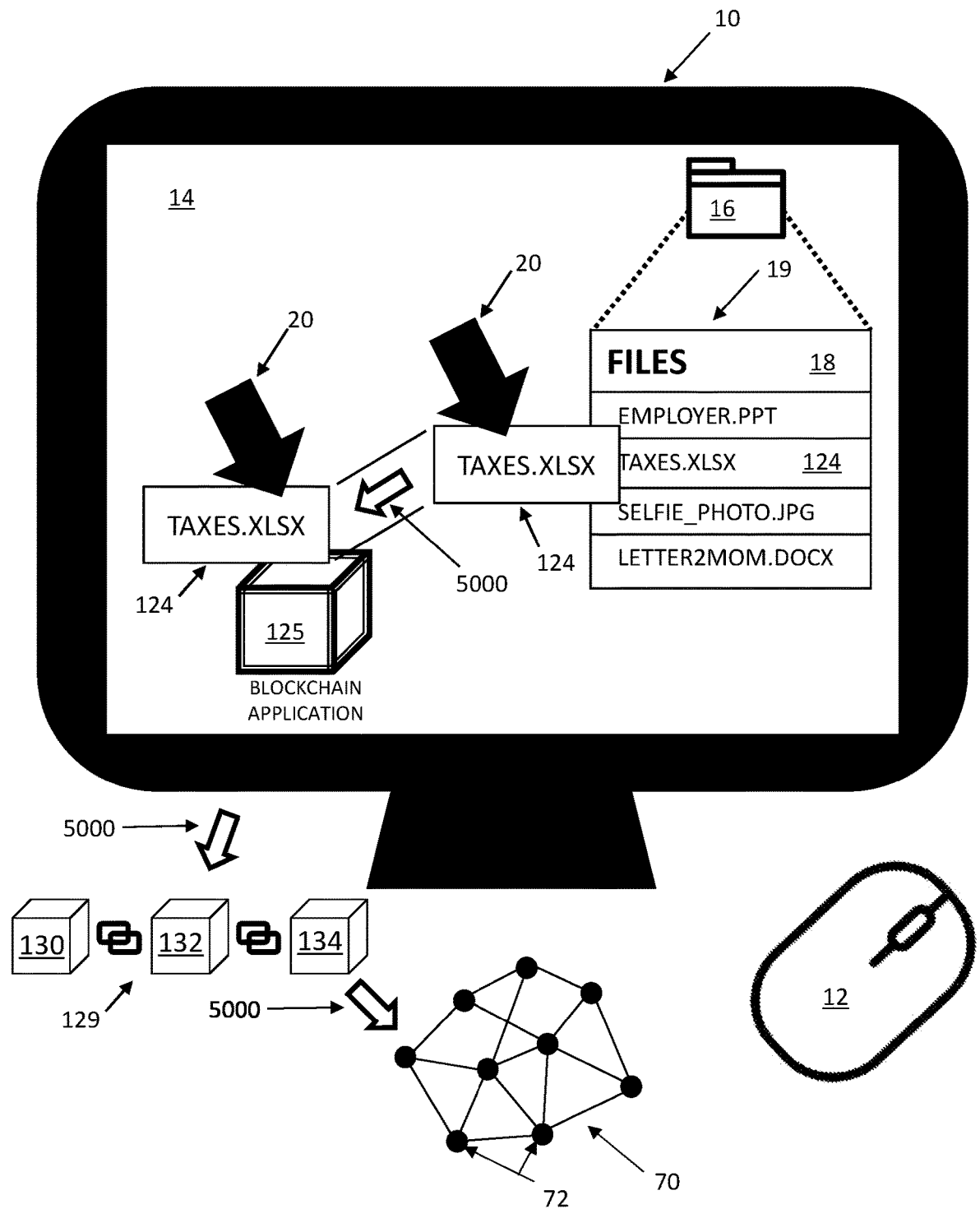

The present specification is not limited to a single embodiment. FIGS. 17-21 illustrate an alternative Graphical User Interface for blockchaining files to a blockchain in which a user would drag and drop a file onto a desktop icon associated with a blockchain computer application that results in the automatic blockchaining of that file to a blockchain designated by the computer blockchain application. In this embodiment, a blockchain computer application is identified by a desktop Graphical User Interface icon. Through the settings, a user would identify a specific blockchain 129 to which the blockchain application would automatically blockchain any and all files 18 dragged and dropped onto the desktop icon 122 through generating new blockchain blocks appended to that specific blockchain 129 that include those files 124 as data. The dragging and dropping of the file onto the desktop icon is the trigger that causes the automatic blockchaining of the file to the blockchain. In this embodiment, FIG. 17 depicts a Graphical User Interface for blockchaining files 18 to a blockchain 129 in which a user would drag and drop a file 124 onto a desktop icon 122 associated with a blockchain computer application that results in the automatic blockchaining of that file 124 to blockchain 129 designated by the computer blockchain application. A computer 10 is depicted in FIG. 17 having a display 14 and a wirelessly connected computer pointing device 12 more commonly referred to as a mouse. Mouse 12 is capable of directing the motion of Graphical User Interface pointer 20 on the display 14. Pointer 20 is shown as an arrow, but may take any kind of iconographic shape pleasing to a user. A GUI file 16 is shown being expanded into a GUI table 19 listing a series of files 18, including the file taxes.xlsx 124. GUI file 16 is a desktop icon that is a part of a file manager application operating on the operating system for computer 10. A user may select file 124 from table menu 19 using mouse 12 and drag and drop it over onto desktop icon 122. Desktop icon 122 is shown as a three-dimensional appearing box to identify it as being associated with a blockchain computer application. The blockchain computer application runs on the operating system for computer 10. Once the file taxes.xlsx is dragged and dropped onto desktop icon 122, the blockchain computer application follows process 5000 detailed in FIG. 21 and automatically blockchains that file to blockchain 129 by creating a new blockchain block 134 that includes file 124 as data. The automatic creation of new blockchain blocks for the files that are dragged and dropped onto the desktop icon 122 occurs directly upon the occurrence of the dragging and dropping of the file onto the desktop icon 122. The dragging and dropping of the file onto the desktop icon is the trigger that causes the automatic blockchaining of the file to the blockchain. A single instance of dragging and dropping one or more files onto the desktop icon 122 may produce a single new blockchain block. Alternatively, a single instance of dragging and dropping multiple files onto desktop icon 122 may produce a separate new blockchain block for each file that is dragged and dropped in that one single instance. Separate blockchain blocks are created for each separate instance of dragging and dropping files onto the desktop icon. This process includes gaining access to blockchain 129 and acquiring the hash digest from the last blockchain block within it, which in this case would be blockchain block 132. The blockchain computer application, pursuant to process 5000, then generates new blockchain block 134 using file 124, the hash digest from the previous blockchain block 132, and a new hash digest based on file 124. The blockchain computer application then, pursuant to process 5000, appends the new blockchain block 134 to blockchain 129 and distributes the new blockchain block 134 onto the nodes 72 of distributed network 70 for storage. Thus, through this straight forward process, a user can select a file 124 from any graphical user interface 16 or 19 of a file manager and drag and drop it onto desktop icon 122 associated with the blockchain computer application in order to automatically cause that file 124 to be blockchained to blockchain 129. This configuration allows for users to easily blockchain files and redundantly store them on a distributed network.

Figure 18:
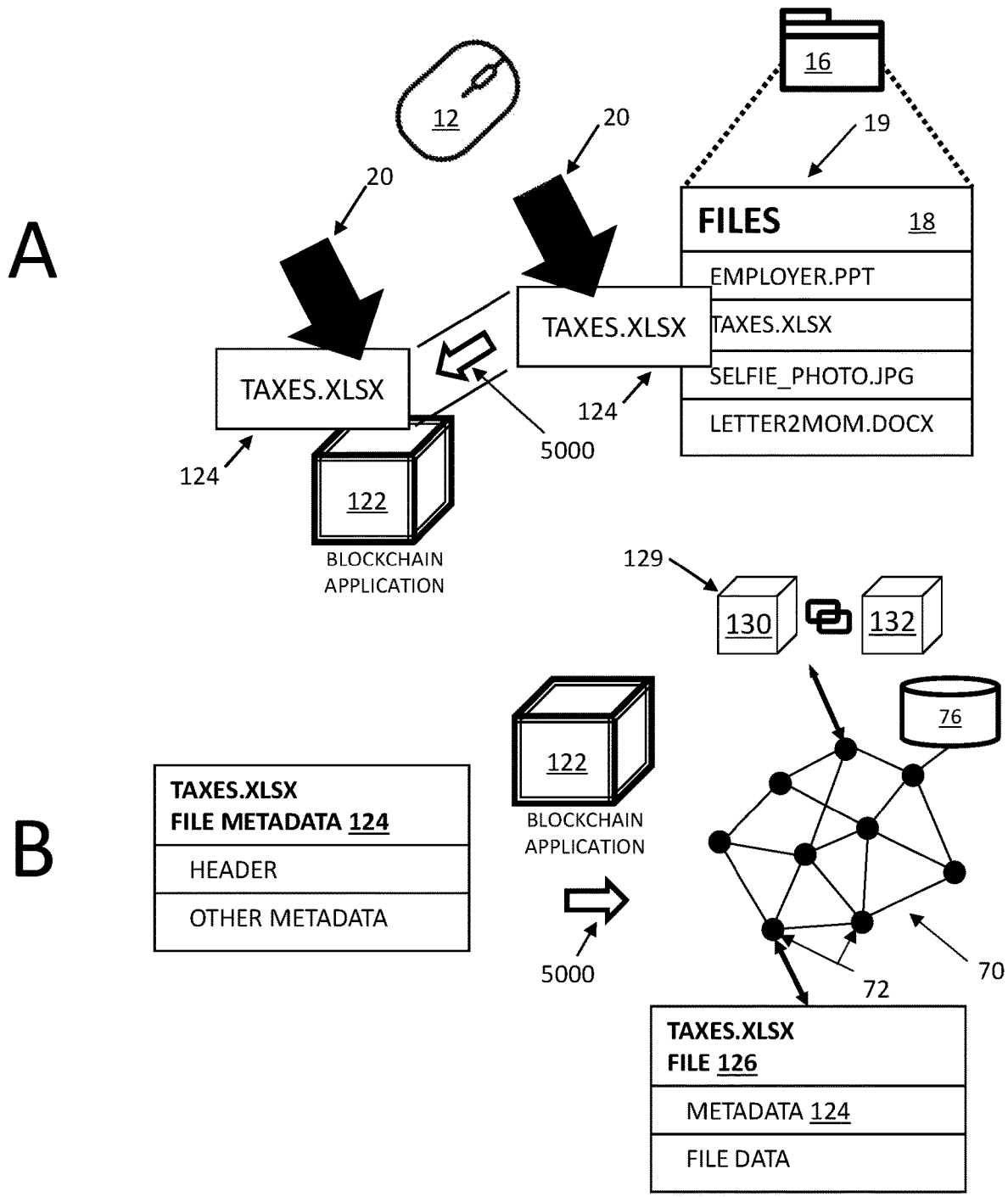

FIGS. 18 and 19 illustrate flow block diagrams as to how a file 124 is selected, blockchained, and pushed onto a distributed network 70 for storage in a series of four steps labeled as A, B, C, and D. FIG. 18 shows the first two steps A and B. FIG. 19 shows the last two steps C and D. FIG. 18 illustrates a flow block diagram of the starting two steps A and B of this process 5000 for automatically adding a file 126 to a blockchain by use of a Graphical User Interface pointer 20 dragging and dropping that file icon 124 onto a desktop icon 122 for a blockchain computer application for automatic blockchaining of that file 126 to the blockchain 129. The automatic creation of new blockchain blocks for the files that are dragged and dropped onto the desktop icon 122 occurs directly upon the occurrence of the dragging and dropping of the file onto the desktop icon 122. A single instance of dragging and dropping one or more files onto the desktop icon 122 may produce a single new blockchain block. Alternatively, a single instance of dragging and dropping multiple files onto desktop icon 122 may produce a separate new blockchain block for each file that is dragged and dropped in that one single instance. Separate blockchain blocks are created for each separate instance of dragging and dropping files onto the desktop icon. In step A, a user employs a mouse 12 to direct a GUI pointer 20 to access a file 124 from a file manager desktop application through a folder icon 16 that reveals an interactive GUI menu 19 listing a table of files 18 including file 124. File 124 is selected, dragged, and dropped onto desktop icon 122 associated with a blockchain computer application running on the operating system of computer 10. This process of selecting, dragging, and dropping file 124 via pointer 20 is done in accordance with process 5000 shown in FIG. 21. This process of dragging and dropping file 124 onto desktop icon 122 associates the metadata 124 of file 124 with the blockchain application and is a direct indication from the user that the user wants the data of file 124 to be added to blockchain 129 through the generation of a new blockchain block 134 that is appended to the last block 132 of blockchain 129. In step B, the blockchain application takes the file metadata of the file 124 and uses it to access the actual file 126 from a storage device. This storage device may be network attached storage 76, any storage node 72 on distributed network 70, or local storage on computer 10. The blockchain application then also accesses blockchain 129 in order to create a new blockchain block 134 containing file 126 as data and appending that new blockchain block 134 to blockchain 129. In order to generate new blockchain block 134, the blockchain application must acquire the hash digest from blockchain block 132, which is the blockchain block immediately preceding the new blockchain block 134. File 126 is the actual file that includes metadata 124 for the file. In a file manager 16 or 19, a user typically accesses the metadata 124 referring to that file 126. Note in step B, blockchain 129 is formed of blockchain blocks 130 and 132. The new blockchain block 134, which is created in step C, does not exist yet in step B. Blockchain 129 is accessed from a storage device such as on computer 10 or through distributed network 70. In FIG. 18, step A is a foreground process. Step B, as well as C and D shown in FIG. 19, are child processes of step A. Step B, as well as C and D shown in FIG. 19, are background processes.

FIG. 19 illustrates a flow block diagram of the end two steps C and D of process 5000 for automatically adding a file 126 to a blockchain 129 by use of a Graphical User Interface pointer 20 dragging and dropping a file icon 124 onto a desktop icon 122 for a blockchain computer application for automatic blockchaining of that file 126 to the blockchain 129. In step C, the blockchain application follows process 5000 and generates a new blockchain block 134 based on file 126 and previous blockchain block 132. New blockchain block 134 is generated by using a hash algorithm identified by the metadata of blockchain 129 as having been used by the previous blockchain blocks along with hash processor 404 to generate a new hash digest for blockchain block 134 based upon file 126 and the hash digest from blockchain block 132. The blockchain application automatically accesses the metadata of blockchain 129 in order to generate a metadata wrapper for the new blockchain block 134 that has the same format as the other blockchain blocks that form blockchain 129 along with the use of the same hash digest as used with the other blockchain blocks of blockchain 129. This new hash digest and the data from file 126 are combined to form new blockchain block 134, which is then appended to blockchain 129, which was previously just formed of blockchain blocks 130 and 132 and accessed from distributed network 70. Blockchain block 134, as shown in the table, includes information in the block such as a header and any other metadata about blockchain block 134. Blockchain block 134 includes the entire file taxes.xlsx 126 as data, which includes the header, other metadata, and file data. Blockchain block 134 also includes a hash digest of prior blockchain block 132. Blockchain block 134 also includes a hash digest of itself. Then in the final step D, the blockchain application, symbolized by desktop icon 122, pushes the new blockchain block 134 newly appended to blockchain 129 onto the nodes 72 of distributed network 70 for redundant storage according to process 5000. This then concludes the creation and storage of file 126 within blockchain 129. Note that file 126 includes metadata 124 that is dragged and dropped onto desktop icon 122. The blockchain application associated with desktop icon 122 accesses file 126 using metadata 124.

Figure 20:
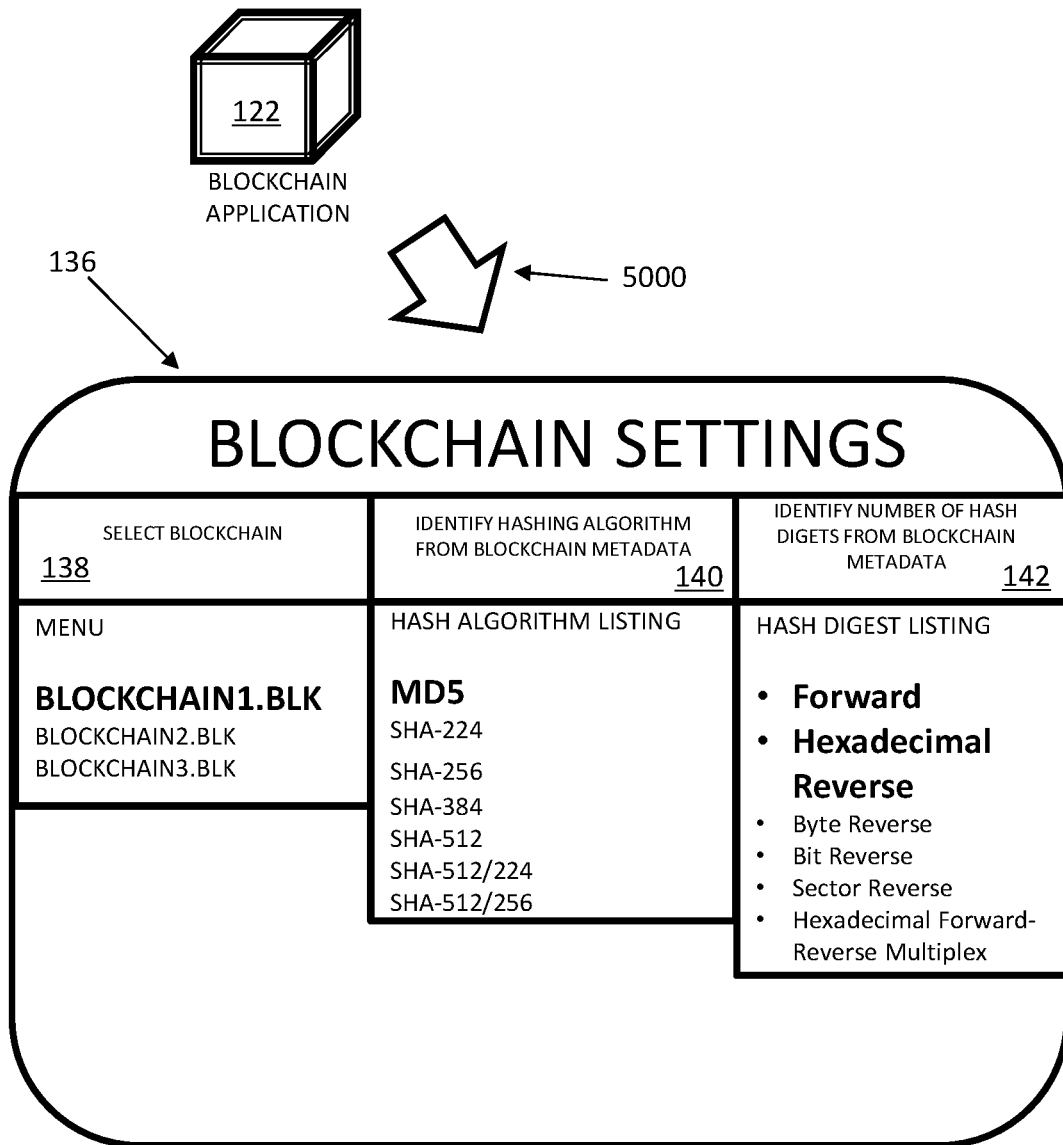

FIG. 20 illustrates a Graphical User Interface 136 for Settings for a blockchain computer desktop application where a user can designate a particular blockchain file to which files 18 dragged and dropped onto the desktop icon 122 for the blockchain computer application are added along with the ability to view various parameters of the blockchain 129 such as the hash algorithm used and types of hash digests used from the metadata of the selected blockchain 129. In the event the blockchain is a new blockchain, the user may specify what the hash algorithm will be and what types of hash digests will be used. Alternatively, the user may deviate from the metadata of the previous blockchain blocks and implement different hash algorithms and hash digest types. As shown in GUI 136, a user may select drop down GUI menu 138 from which a user may select a specific blockchain file to which any and all files 18 are blockchained to such as file 126. In this example, the blockchain identified by the file name blockchain1.blk has been selected as the designated blockchain to which files 126 are added. Here, the file blockchain1.blk is blockchain 129 including blockchain blocks 130 and 132 and eventually 134 after it has been generated. Menu 138 shows that other blockchain files may be selected as the designated blockchain to which new blockchain files are added through the drag and drop process 5000. GUI drop down menu 140 allows for a user to view the hash algorithm used in the blockchain selected in menu 138. In this example, MD5 is the hash algorithm that was used with blockchain 129 as identified within metadata contained in blockchain 129. Menu listing 140 shows other hash algorithms not used within blockchain 129, but could be used in other blockchains. GUI menu 142 lists the type and number of hash digests used for each blockchain block. Conventionally, blockchains have a single hash digest that is created by a hash algorithm by hashing a number left to right. However, multiple different hash digests may be created using the same hash algorithm on the same set of input data by inputting that data into the hash processor in different ways and in different orders using the same hash algorithm. For example, reading the same data into a processor in different orders by bit, by byte, by sector, or by hexadecimal number can produce different hash digests with the same hash algorithm. In addition, reading the data left to right will produce a different hash digest than when that same data is read into the processor right to left based on bit, byte, hexadecimal, or sector. A multiplex hash digest may also be created as a combination of reading a number in forward and reverse. More disclosure on the types and numbers of hash digests is disclosed by U.S. Pat. No. 10,708,040 invented by Tyson York Winarski, which is hereby incorporated by reference in its entirety.

Figure 21:
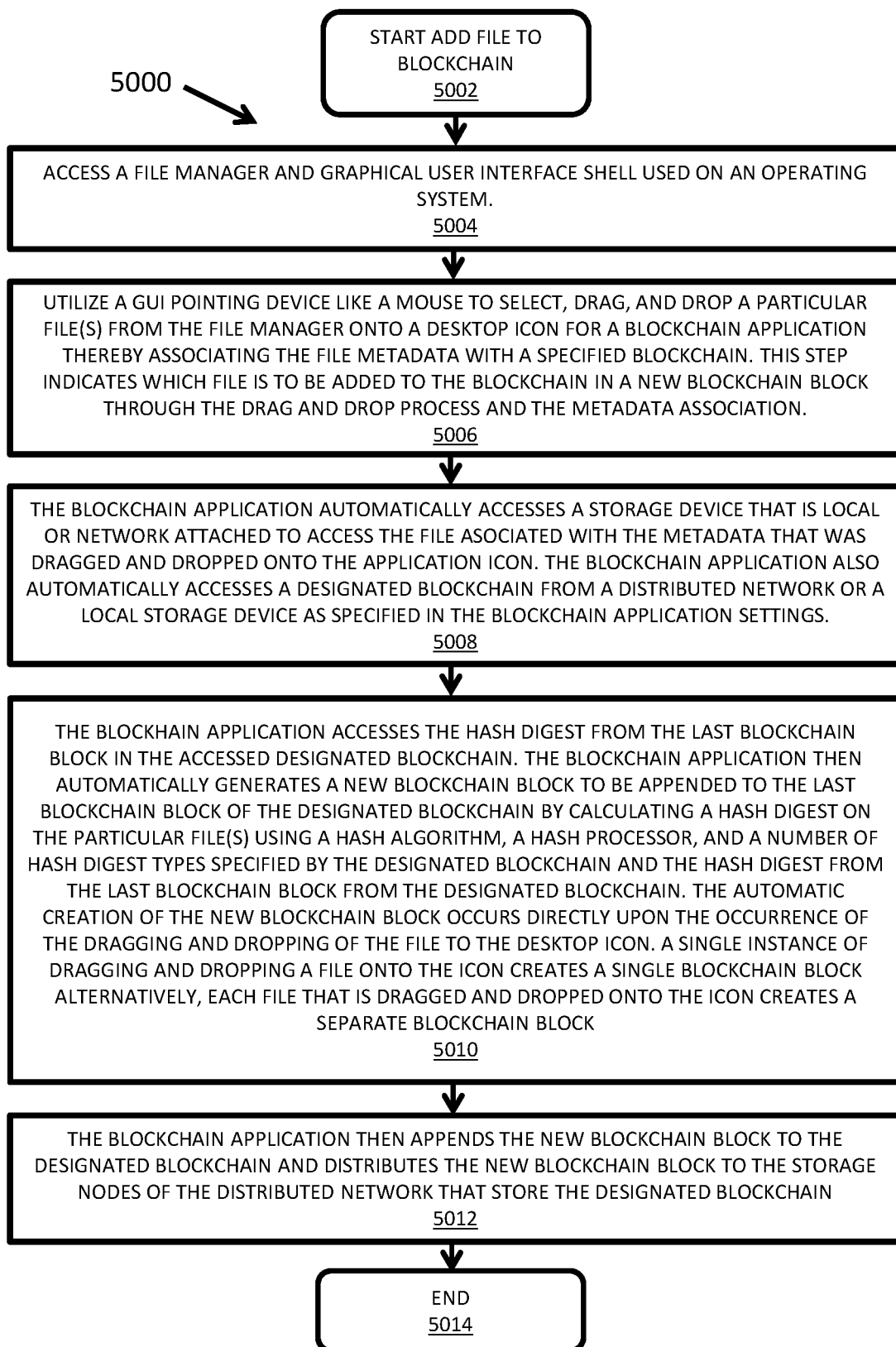

FIG. 21 illustrates a flow chart 5000 depicting a process 5000 for automatically adding a file 126 to a blockchain 129 by use of a Graphical User Interface pointer 20 dragging and dropping a file icon 124 onto a desktop icon 122 for a blockchain computer application that automatically blockchains that file 126 to that designated blockchain 129. File icon 124 can be any form of metadata identifying file 126, such as a displayed file name, icon image, or combination of the two. The process begins with START in step 5002. Then in step 5004, a user utilizes a pointer 20 to access a file manager 16 and 19 and graphical user interface shell used on an operating system for computer 10. Then in step 5006, the user utilizes the GUI pointing device 12 to select, drag, and drop a particular file 126 or files from the file manager 16 and 19 onto a desktop icon for a blockchain application. In the selection, dragging, and dropping process, the user is actually moving a metadata icon 124 that represents the particular file 126 with pointer 20. Selecting, dragging, and dropping metadata 124 from the file manager 16 or 19 onto desktop icon 122 associates file metadata 124 with a specified blockchain 129. Blockchain 129 is designated as the blockchain to which all files dragged and dropped are added. In step 5008, the blockchain application automatically begins the process of creating a new blockchain block 134 for blockchain 129 that contains file 126 as data by accessing file 126 using metadata 124 and accessing blockchain 129 as specified in the settings of the blockchain application. In step 5008, the blockchain application accesses a storage device to access the file 126 designated by file metadata 124. This storage device may be internal to computer 10 like cache, a HDD, or an SDD. Alternatively, this storage device may be external to computer 10 such as an external drive, a node on a distributed network, or network attached storage. In step 5008, blockchain 129 consists of blocks 130 and 132. In step 5010, the blockchain application accesses the hash digest from the last blockchain block 132 in order to form new blockchain block 134. In step 5010, the blockchain application automatically generates new blockchain block 134 by taking a hash digest of file 126 and the hash digest from blockchain block 132. Blockchain block 134 is thereby formed of the hash digest from blockchain block 132, the file 126 as data, and the hash digest formed of file 126 and the hash digest from the previous blockchain block 132. Blockchain application automatically creates new blockchain block 134 to include file 126 as data and append it to blockchain 129 based directly upon the triggering action of dropping file metadata 124 onto blockchain application icon 122. The automatic creation of new blockchain blocks for the files that are dragged and dropped onto the desktop icon 122 occurs directly upon the occurrence of the dragging and dropping of the file onto the desktop icon 122. A single instance of dragging and dropping one or more files onto the desktop icon 122 may produce a single new blockchain block. Alternatively, a single instance of dragging and dropping multiple files onto desktop icon 122 may produce a separate new blockchain block for each file that is dragged and dropped in that one single instance. Separate blockchain blocks are created for each separate instance of dragging and dropping files onto the desktop icon. The hash algorithm used to generate blockchain block 134 is selected from the metadata of blockchain 129 that identifies the hash algorithm used in the other blockchain blocks of that blockchain 129. In addition, blockchain block 134 may have one or more types of hash digests. It may have a conventional hash digest formed by hashing the data of file 126 in a conventional manner. However, multiple hash digests may be created by hashing the data of file 126 in different ways with the same hash algorithm by entering the data into a hash processor in different orders such as by bit, by byte, by sector, and by reading the data left to right or right to left. Producing multiple different hash digests using the same hash algorithm by hashing the input data in different orders produces different hash digests on the same data that can distinguish between two files that may produce a hash digest collision with one single type of hash digest. In step 5012, the blockchain application then appends the new blockchain block 134 to blockchain 129 and distributes the new blockchain block 134 to the storage nodes 72 of distributed network 70 that store blockchain 129. The process then ENDS with step 5014. Step 5004 and 5006 are foreground processes.

Figure 22:
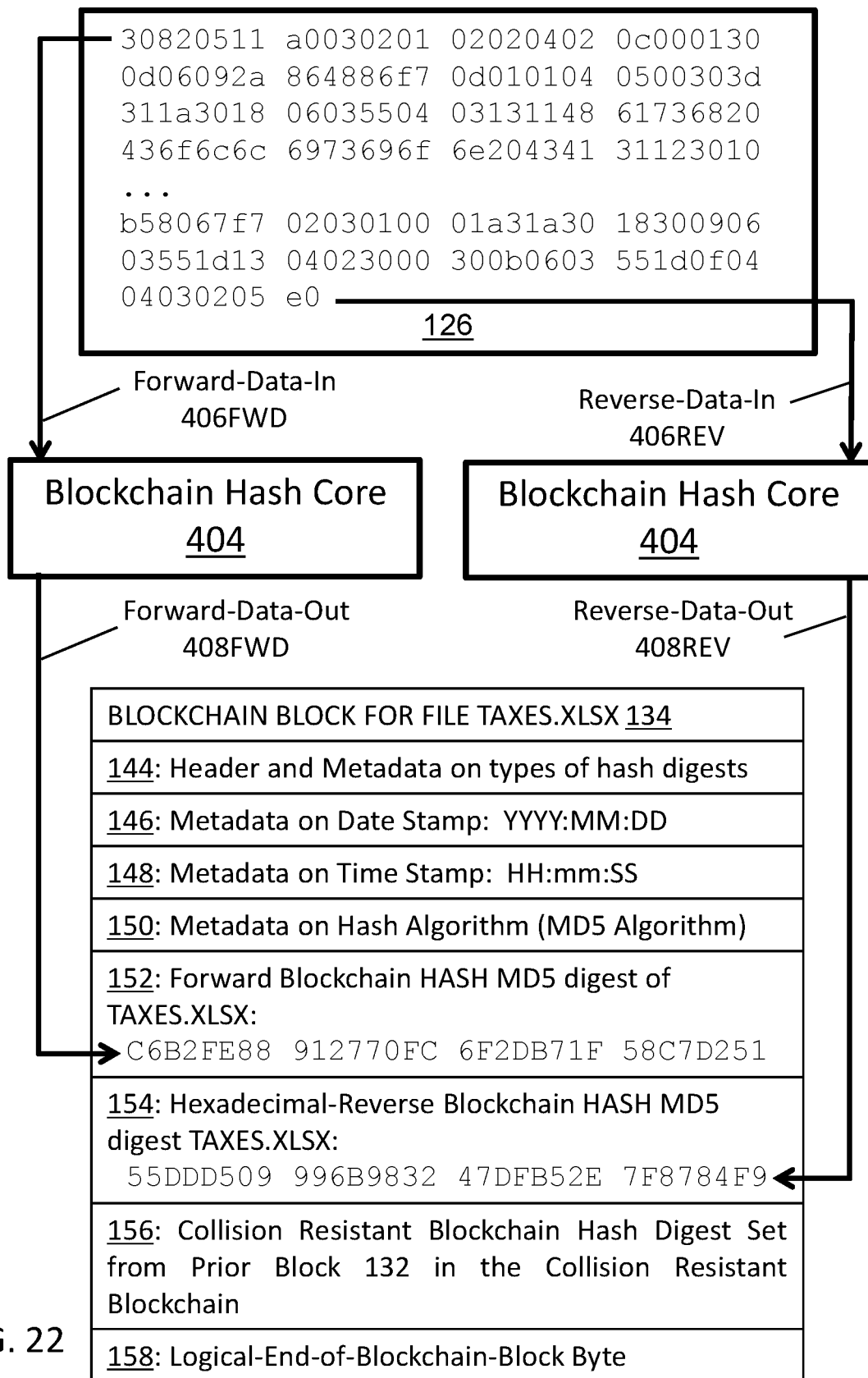
FIG. 22 illustrates a flow block diagram showing how multiple hash cores develop multiple different hash digests from a common file in parallel using the same hash algorithm to produce a new blockchain block that includes the file as data.

FIG. 22 illustrates a flow block diagram showing how multiple hash cores 404 develop multiple different hash digests from a common file 126 in parallel using the same hash algorithm to produce a new blockchain block 134 that includes the file 134 as data. File 126 is shown at the top of the figure in exemplary hexadecimal representation. In FIG. 22, two different blockchain hash cores 404 are used to generate two different hash digests based off of file 126. One hash core 404 processes the file 126 by reading the file left to right in a forward direction. The other hash core 404 processes the file 126 by reading the file right to left in a reverse direction. Reading the file 126 in these two different directions creates two different hash digests. When two different files are hashed in the same manner with the same hash algorithm, a collision can result opening the door to a birthday type hacking attack. Using a second hash digest created with the same hash algorithm by entering the data into the hash processor in a different order generates a different hash digest that can distinguish between two different files that produce a collision under one type of hashing. In this example, two hash cores 404 process file 126 in different orders to produce two different hash digests 152 and 154, both of which are included in blockchain block 134. The table at the bottom of FIG. 22 is the data table for blockchain block 134 that includes the file taxes.xslx as data. Blockchain block 134 includes a header 144 that includes metadata on the types of hash digests uses, such as a forward hash digest and a reverse hash digest. Blockchain block 134 may also include metadata 146 containing a date stamp on when blockchain block 134 was created. Blockchain block 134 may also include metadata on a time stamp as to when blockchain block 134 was created. Blockchain block 134 may also include metadata 150 on the hash algorithm used, such as MD5. Blockchain block 134 may then include one or more hash digests formed from file 126. In this case blockchain block 134 includes two hash digests 152 and 154 that were formed in parallel by two different hash cores 404 that hashed file 126 in different orders to produce two different hash digests. Blockchain block 134 then also includes a hash digest 156 from prior blockchain block 132 in order to form the cryptographic chain between blocks 132 and 134, thereby creating a blockchain. In this case, as blockchain 129 is formed using two different types of hash digests formed from a common hash algorithm, hash digest 156 is actually a set of hash digests. Hash digest 156 may be a single hash digest from previous blockchain block 132, or be multiple hash digests created to avoid collisions and grouped into a collision resistant hash digest set. Blockchain block 134 then concludes with a logical end of blockchain byte 158. Blockchains in this specification may take the configuration of a Merkle-tree.

Figure 23:
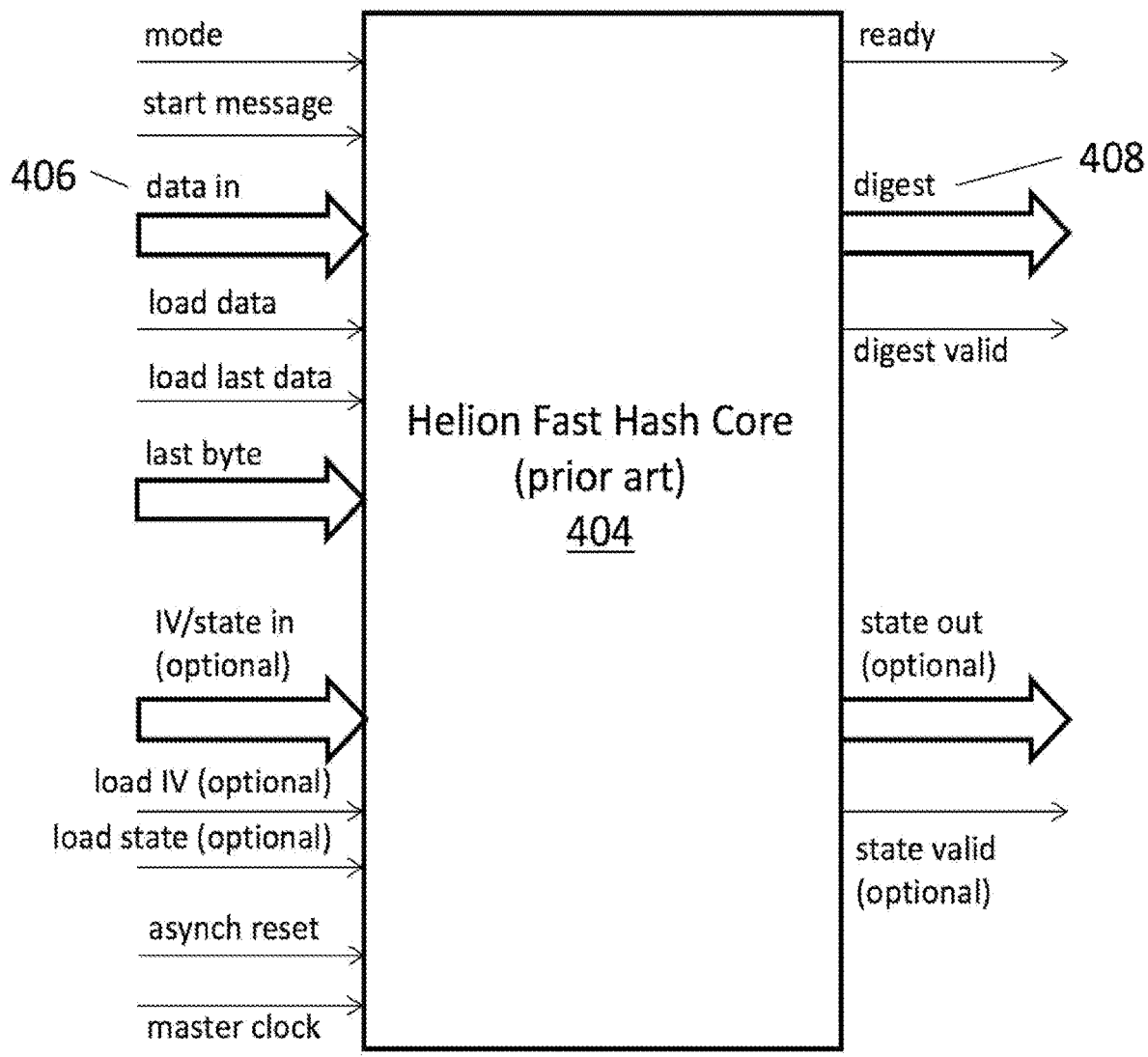
FIG. 23 illustrates a block diagram of a processor configured to compute hash digests with a hash algorithm.

FIG. 23 illustrates a block diagram of a hash processor 404 configured to compute hash digests with a hash algorithm. FIG. 23 illustrates a prior-art diagram of the Helion Technology Fast Hash Core Application Specific Integrated Circuit (ASIC) 404, which may be resident in computer 10. The Helion Fast Hash Core family implements the NIST approved SHA-1, SHA-224, SHA-256, SHA-384 and SHA-512 secure hash algorithms to FIPS 180-3 and the legacy MD5 hash algorithm to RFC 1321. These are high performance cores that are available in single or multi-mode versions and have been designed specifically for ASIC. Data to be blockchained, such as file 126, is fed into this ASIC at 406 and the resulting blockchain hash digest output is 408. Such dedicated hash core ASICs have faster performance than software running in a cloud, or computer memory under an operating system. One hash core 404 could calculate the forward blockchain hash digest, and in parallel, a second hash core 404 calculate the reverse blockchain, as shown in FIG. 22. More information on this HASH core can be found at https://www.heliontech.com/downloads/Helion_PB_-_Hash_(Fast)_ASIC.pdf#view=Fit.

Figure 24:
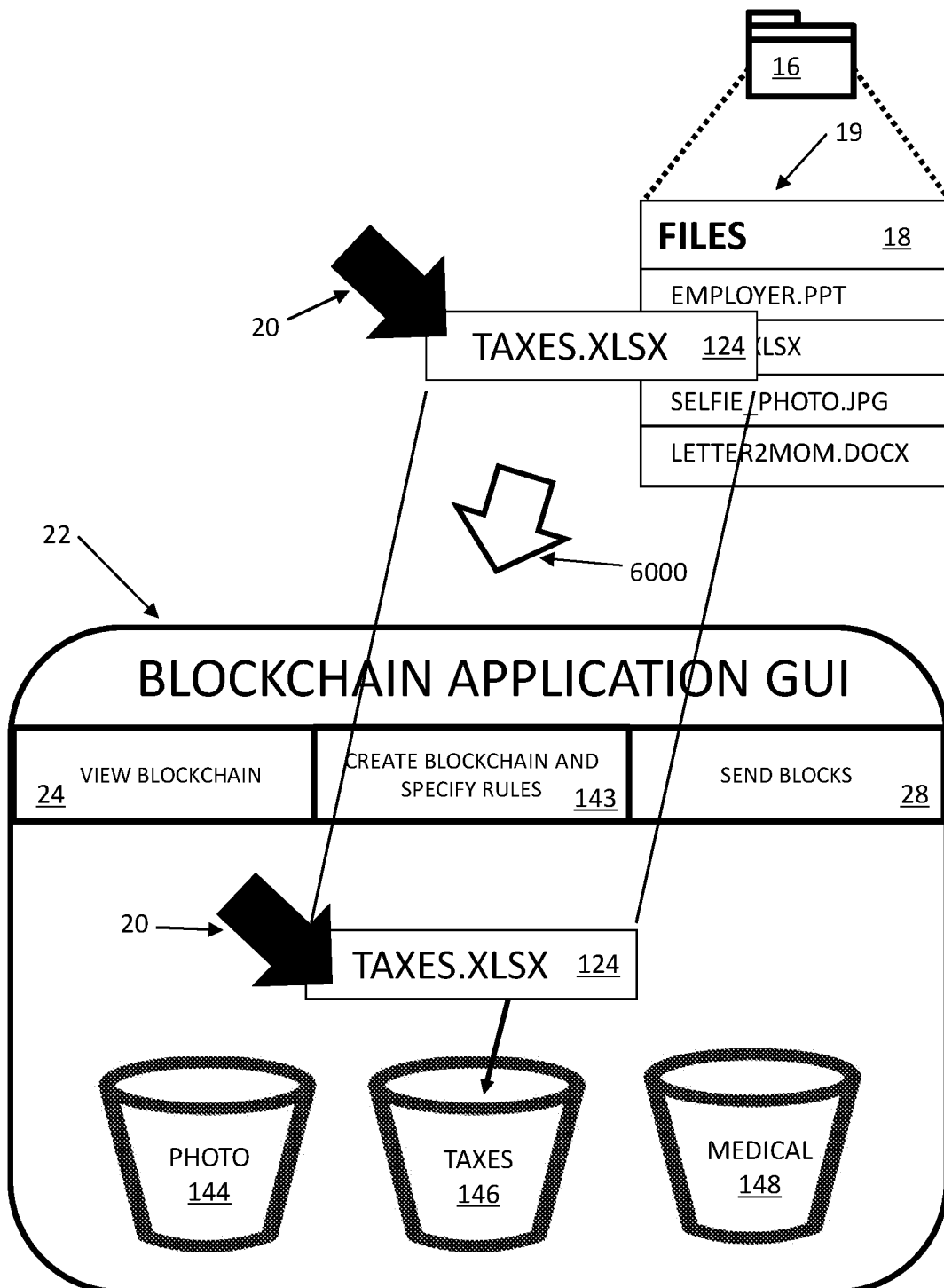
FIGS. 24-28 illustrate another alternative Graphical User Interface (GUI) of a desktop blockchain computer application for blockchaining files to a blockchain in which a user would drag and drop a file onto one of a plurality of icons displayed within in the GUI of the application where each icon is directly associated with a specific dedicated blockchain for automatic blockchaining of that file to that blockchain.
Figure 25:
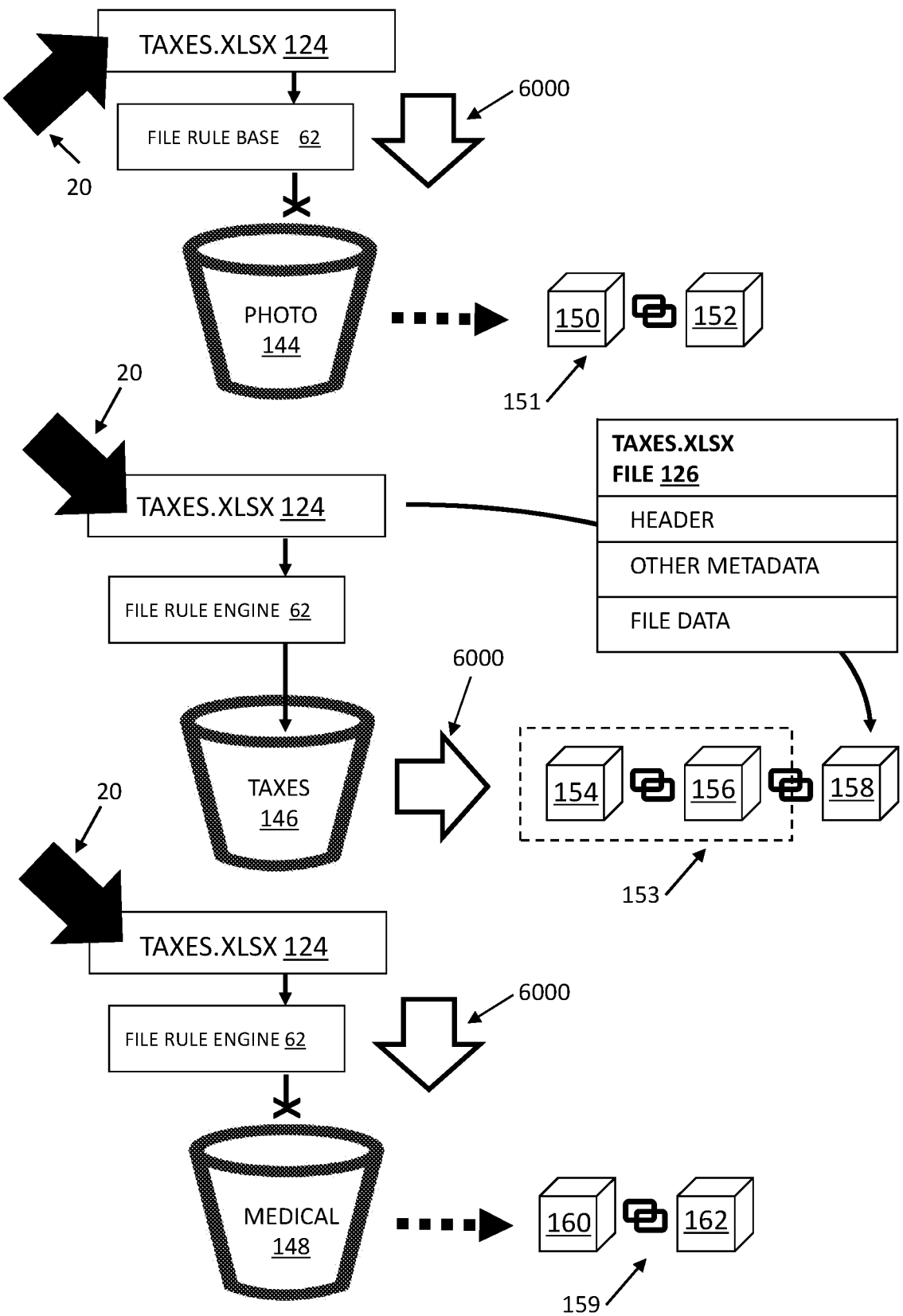
Figure 26:
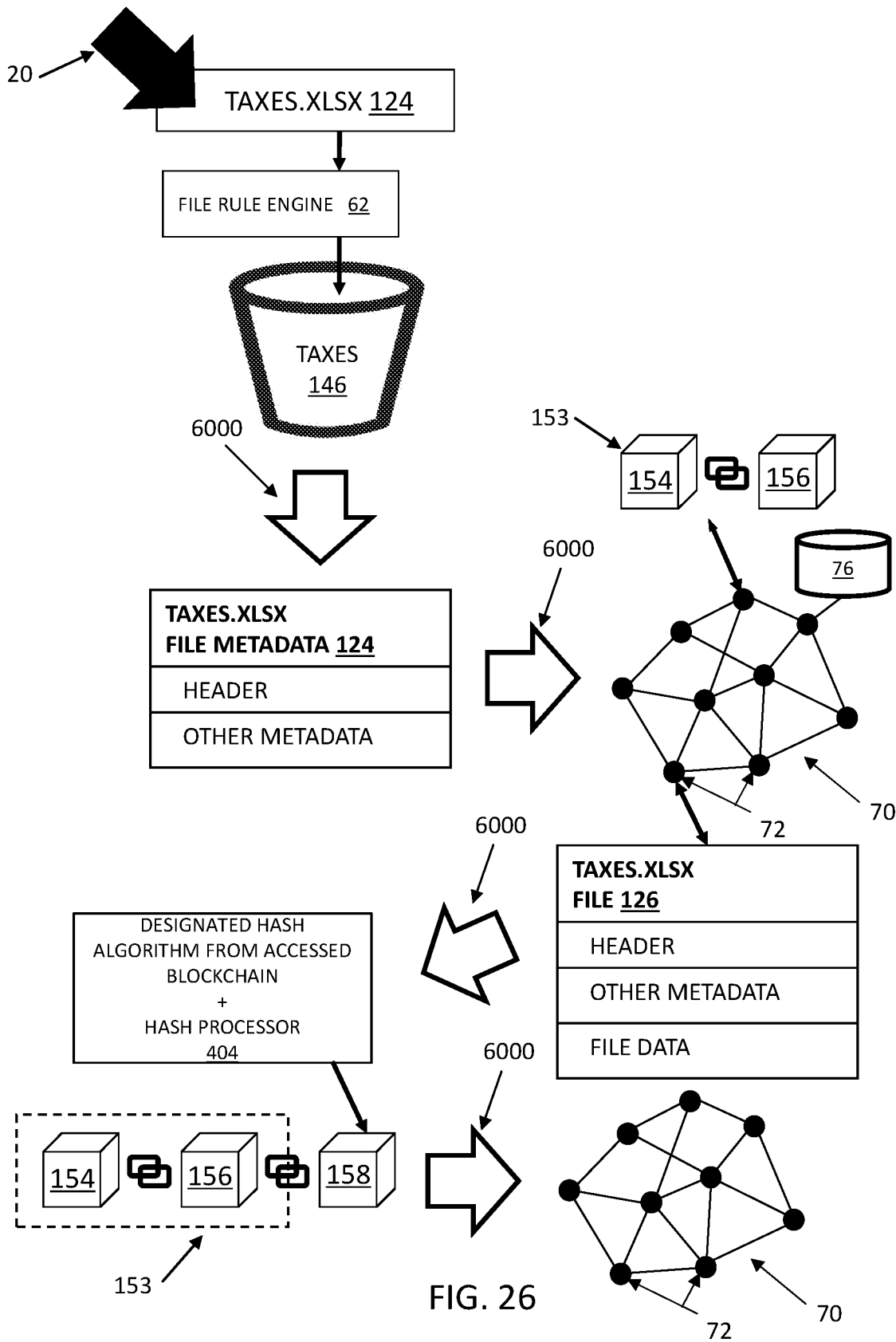

FIGS. 24-28 illustrate another alternative Graphical User Interface (GUI) 22 of a desktop blockchain computer application for blockchaining files 18 to a blockchain 153 in which a user would drag and drop metadata 124 for a file 126 onto one of a plurality of icons 144, 146, and 148 displayed within in the GUI 22 of the application where each icon 144, 146, and 148 is directly associated with a specific dedicated blockchain 151, 153, or 159 for automatic blockchaining of that file 126 to that blockchain 153. FIGS. 24-26 illustrate block flow diagrams of a blockchaining process 6000 shown in FIG. 28. FIG. 24 depicts a process of using a Graphical User Interface (GUI) pointing device 12 and pointer 20 to select a file 126 by pointing to file metadata 124 with pointer 20 from a file menu 19 and dragging and dropping it onto a GUI icon 146 within the application in which the icon 146 is directly associated with a designated blockchain 153 for automatic blockchaining of that file 126 to that blockchain 153. The process of adding file 126 to blockchain 153 is triggered to occur automatically when file metadata 124 is dropped on icon 146 designating blockchain 153 as the blockchain to which file 126 is to be stored within. Computer 10 includes a display 14 that shows GUI 22 for the blockchain application. Display 14 also shows pointer 20 and file manager icon 16 showing a computer file. Icon 16 may be clicked on to reveal a tabular listing 19 of files 18 that are organized and stored within computer file 16. Following process 6000 discussed in FIG. 28, a user may select file metadata 124 identifying associated file 126 and drag and drop it onto one of the icons 144, 146, and 148 shown on GUI 22. Each icon 144, 146, and 148 is shown as a bucket for illustrative purposes to illustrate which bucket collects files for automatic blockchaining to a single blockchain associated with that icon 144, 146, or 148. Icons 144, 146, and 148 are shown as buckets for illustrative purposes only and may take the form of any visual icon of any configuration, color, or shape pleasing to a user or software developer. In this case, pursuant to process 6000, file metadata 124 for the file taxes.xlsx is dragged and dropped onto bucket 146 in order to be automatically blockchained to blockchain 153. Here, bucket 144 is associated with blockchain 151, bucket 146 is associated with blockchain 153, and bucket 148 is associated with blockchain 159. For organizational purposes and reasons for who may have access to various blockchains for purposes of sharing and collaboration, a user may wish to have separate blockchains that receive different specific categories of files. For example, in FIG. 24, bucket 144 is designated as receiving PHOTO files that are automatically blockchained to blockchain 151. Bucket 146 receives tax related files that are automatically blockchained to blockchain 153. Bucket 148 receives medical related files that are automatically blockchained to blockchain 159. The user may share blockchain 151 that contains photos with friends and family. The user may share taxes blockchain 153 with their accountant. The user may then share medical blockchain 148 with their doctor, insurance company, or pharmacist. By designating separate icons 144, 146, and 148 to receive different types of files, the user can separate and organize files into different blockchains that may be then distributed and shared with different groups of end users. Providing a name to icons 144, 146, and 148 along with a different shape or color is one way of allowing a user to distinguish between these various buckets to allocate files based on type amongst blockchains 151, 153, and 159 accordingly. To support this task of separating files into storage within different blockchains 151, 153, and 159, file rule engine 62 shown in FIG. 3 may be employed to create rules restricting which files may be dropped on which buckets based on any criteria inherent to the file such as file type, associated application of the file, hashtags, metadata, file size, file date, or other file criteria. For example, buckets 146 and 148 may include rules preventing the addition of any file having a photo format, thereby making bucket 144 the only bucket that can receive files having an image format. Buckets 144 and 148 could be provided with rules blocking files that have hashtag metadata for taxes making bucket 146 the only bucket that could receive tax files that have tax hashtags. Alternatively, bucket 146 could have a rule specifying that it could only accept files with a hashtag for taxes. Any type of permissive or restrictive rule could be configured for limiting types of files that could be dropped on any of these buckets 144, 146, and 148 in order to assist the user with organizing their files 18. GUI 22 also includes various drop-down menus such as menu 24 allowing a user to access and view blockchains as discussed with respect to FIGS. 9-11. GUI 22 may also include drop-down menu 28 for sending various blockchains or individual blockchain blocks to designated recipients as discussed in FIGS. 12 and 13. Dropping file metadata 124 onto bucket icon 146 automatically triggers the process of blockchaining file 126 identified by metadata 124 to blockchain 153 that is associated with bucket 146. FIG. 24 illustrates steps 6002, 6004, and 6006 in FIG. 28. FIG. 24 illustrates a foreground process.

FIG. 25 illustrates a flow block diagram illustrating the process of applying the file rule engine 62 from FIG. 3 to the dragging and dropping of file metadata 124 onto a GUI icon 144 associated with a designated blockchain 153 for automatic blockchaining of that file 126 tied to the file metadata 124 to that blockchain 153. FIG. 25 illustrates steps 6006, 6008, 6010, and 6012 in FIG. 28. FIG. 24 illustrated the selecting, dragging, and dropping of file metadata from a file manager application onto an icon that is tied to a particular blockchain for automatic blockchaining. This embodiment employs a file rule engine 62 that determines whether a particular file can be dragged and dropped onto a specific blockchain icon 144, 146, and 148 as discussed in FIG. 3. The file rule engine 62 can specifies which files can and cannot be dropped onto a particular blockchain icon 144, 146, or 148 based on criteria of the file such as file type, file size, file creation date, file metadata, file hashtags, the application associated with executing the file, or other criteria regarding the file. The function of the file rule engine 62 is to assist the user with organizing files in to specific blockchains 151, 153, and 159. In this example, blockchain 151 is dedicated to blockchaining files with a photo-image format. To ensure that blockchain 151 receives files having a photo-image format only, blockchain 151 is exclusively associated with a blockchain icon 144 labeled and configured to visually show that it accepts photo-image files. To further ensure that blockchain 151 receives files having a photo-image format only, file rule engine 62 has a rule that allows photo-image file metadata to be dropped on photo blockchain icon 144 only and blocks any other type of file. The label and visual configuration of blockchain icon 144 assists users with visually identifying which blockchain accepts photo-image files through the dragging and dropping process. The file rule engine 62 supports the visual identification function of blockchain icon 144 by preventing non-photo image files from being joined to blockchain 151. In addition, file rule engine 62 can prevent photo-image files from being inadvertently to blockchains 153 or 159. In this example, blockchain 153 is dedicated to tax related files such as spreadsheets or other documents. Blockchain icon 146 is directly associated with blockchain 153 and is labeled and visually configured to identify itself as the icon for tax related files. Blockchain 159 is dedicated to medical files. Blockchain icon 148 is directly associated with blockchain 159. File rule engine 62 restricts the files that may be dropped onto blockchain icon 146 to those files that are tax related based upon file metadata. File rule engine 62 restricts the files that may be dropped onto blockchain icon 148 to those files that are medical related based on file metadata. In FIG. 25, file rule engine 62 is configured to restrict the addition of the file taxes.xlsx to the tax dedicated blockchain. As such, file rule engine 62 allows the file taxes.xlsx to be dropped onto blockchain icon 146, but not blockchain icons 144 or 148 according to process 6000. As shown in FIG. 25, file rule base 62 blocks the file taxes.xlsx from being dropped onto blockchain icon 144 and blockchain icon 148. However, file rule engine 62 allows taxes.xlsx to be dropped onto blockchain icon 146 that results in the blockchain application accessing blockchain 153, which is directly associated with blockchain icon 146. As a result, according to process 6000, the blockchain application acquires the file taxes.xlsx from memory and generates blockchain block 158 to include the file taxes.xlsx as data using the hash digest from blockchain block 156 and appends blockchain block 158 to blockchain 153 making blockchain block 158 the last blockchain block of blockchain 153. FIG. 25 expands on the disclosure of FIG. 24 to diagrammatically illustrate how each blockchain icon 144, 146, and 148 is directly associated with a separate blockchain 151, 153, and 159 as well as the application of rules by the file rule engine 62 to control which files can be blockchained to which blockchain based upon criteria of the files. In FIG. 25, the process of dragging and dropping file 124 onto icon 144, 146, or 148 is a foreground process. The application of rule base engine 62 to the dragging and dropping of file 124 onto icons 144, 146, and 148 is a foreground process as it controls whether the user can drag and drop of the file 124 successfully onto icon 146 or block it from being dropped onto icons 144 and 148. The subsequent blockchaining of file 124 onto blockchain 153 and blockchain block 158 is a child process of the dragging and dropping of file 124 onto icon 146. The subsequent blockchaining of file 124 onto blockchain 153 and blockchain block 158 is a background process.

FIG. 26 illustrates a flow block diagram illustrating the process of blockchaining files to a blockchain in which a user would drag and drop a file onto one of a plurality of icons displayed in the GUI of the application where each icon is directly associated with a specific dedicated blockchain for automatic blockchaining of that file to that blockchain. FIG. 26 illustrates steps 6006 through 6014 in FIG. 28 of process 6000. FIG. 26 expands on FIGS. 24 and 25 to illustrate how dropping the file metadata 124 for the taxes.xlsx onto blockchain icon 146 automatically triggers the blockchain application to access file 126 based on the file metadata 124 and access blockchain 153 based on its direct association with blockchain icon 146 per process 6000. After accessing blockchain 153 and file 126 from a storage device within or external to computer 10, or from a storage node 72 on network 70, the blockchain application automatically accesses hashing metadata from blockchain 153 to determine what hash algorithm to use along with what types of hash digests to generate in order to produce blockchain block 158 that includes hash information from block 156 and file 126 as data per process 6000. Then, also per process 6000, the blockchain application automatically pushes new blockchain block 158 out onto distributed network 70 for storage on nodes 72.

Figure 27:
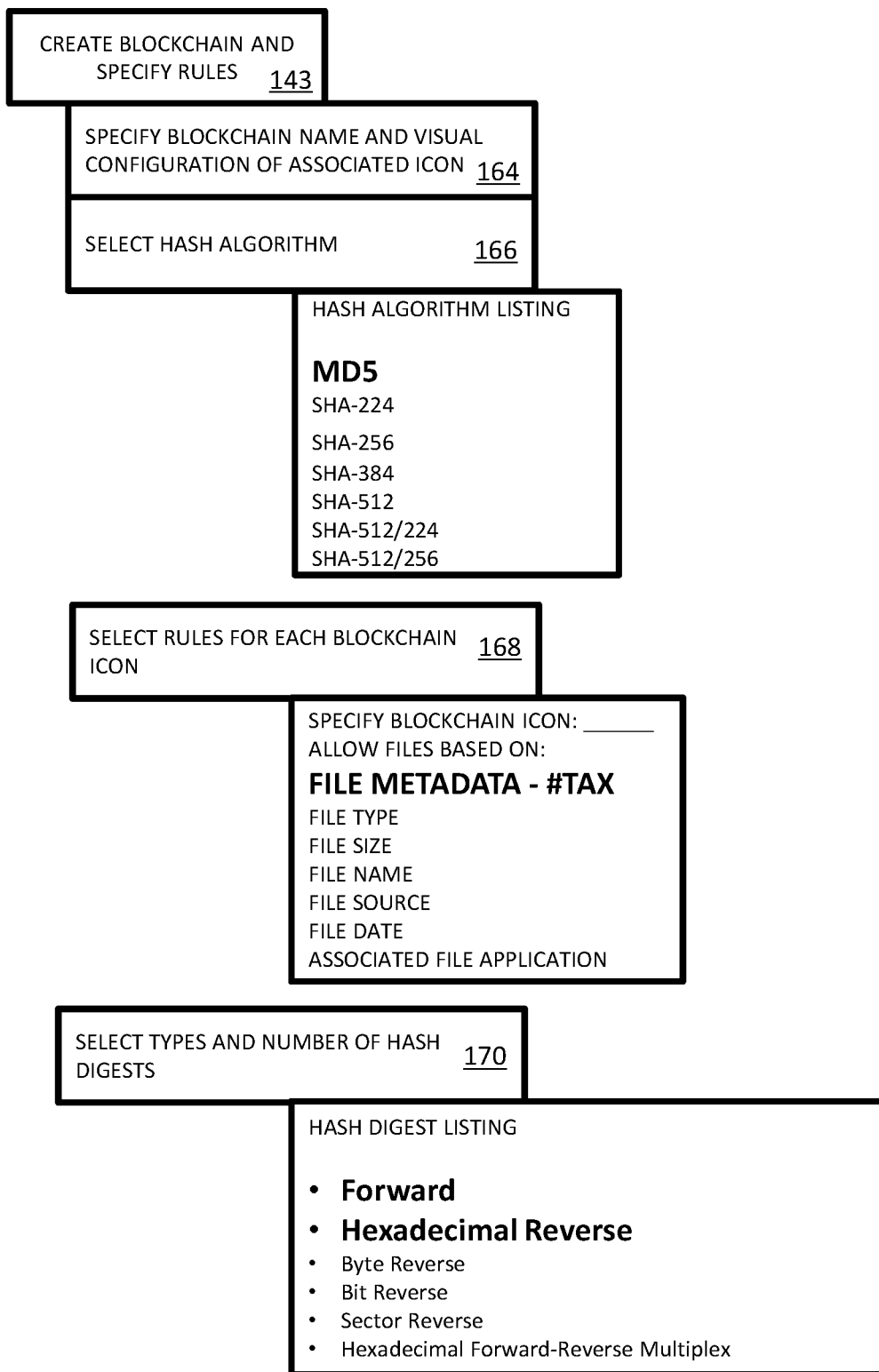

FIG. 27 illustrates a series of Graphical User Interface (GUI) drop down menus for the computer application as they would appear on GUI 22 for automatically blockchaining of files that are dragged and dropped onto an icon directly associated with a specific blockchain. GUI Menu 143 is designated for providing user options for creating a blockchain and specifying rules. In GUI menu option 164, the user may specify the name for the new blockchain as well as configure the shape and color of its associated blockchain icon. In GUI menu option 166, the user may select a specific hash algorithm for hashing data associated with the blockchain such as MD5, SHA-224, SHA-256, SHA-384, SHA-512, SHA-512/224, and SHA-512/256. In this case, MD5 has been selected and is shown in BOLD. GUI menu 168 allows a user to select rules to specify file criteria in which to allow or block files being dropped onto particular blockchain icons 144, 146, and 148. Here, a user would first specify a blockchain icon and then specify file criteria in which to block or permit files being dropped onto the blockchain icon. For example, a user would first specify one particular blockchain block with menu 168 and then specify one or more criteria from the exemplary list to associate as rules for that blockchain block. Criteria are based on attributes of files, such as file metadata, file type, file size, file name, file source, file date, or software applications associated with the file, or any other file metadata or attributes. Lastly, in GUI menu 170, users may specify types and numbers of hash digests. For example, a conventional hash digest is one in which the data is hashed from left to right, which is referred to as a forward hash digest. That data can be hashed with the same hash algorithm to produce a different hash digest by reading that data into the hash processor from right to left producing a reverse hash digest. Other different hash digests can be produced using the same input data and the same hash algorithm by reading the data into the hash processor in different orders, such as by bit, by byte, by disk sector, or by hexadecimal in either the forward or reverse directions. Further, one can produce a different hash digest by multiplexing between the forward and reverse hash directions, such as taking one byte from the front of the data and one byte from the end of the data and incrementing between forward and reverse bytes until the entire set of data is hashed. These different hash digests are valuable in that the use of them prevents cryptographic collisions where two different files can result in the same hash digest with the same hash algorithm that can produce a birthday type hacking attack. Use of multiple different hash digests with the same data and same hash algorithm can distinguish between collisions and identify when there is a collision or if the files are actually identical.

Figure 28:
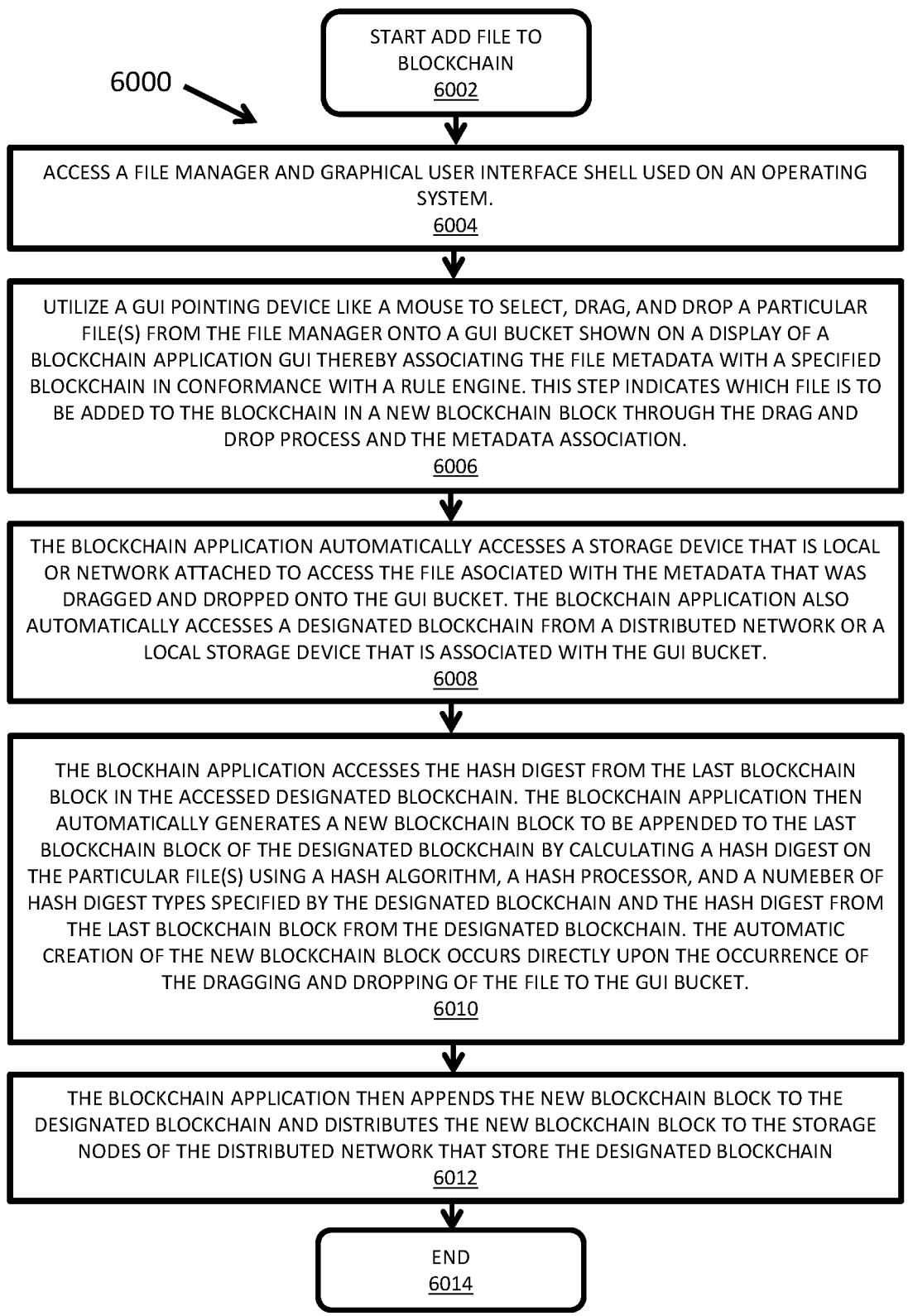

FIG. 28 illustrates a flow chart 6000 depicting a process 6000 for using a Graphical User Interface (GUI) pointing device 12 and 20 to select file metadata 124 from a file menu 19 and dragging and dropping it onto a GUI icon 146 within a desktop computer application for blockchain files in which the icon 146 is directly associated with a designated blockchain 153 for automatic blockchaining of that file 126 to the blockchain 153. Process 6000 begins with START 6002. In step 6004, GUI pointer 20 is directed to access file metadata 124 associated with a file 126 from a GUI file manager 19. In step 6004, the GUI pointer 20 is used to select the file metadata 124 from the file manager and drag and drop it onto a particular blockchain block icon 146 in order to trigger the blockchain application to store file 126 within blockchain 153 by creating a new blockchain block 158. Blockchain 158 is selected as the blockchain in which to store the file 126 within a new blockchain block 158 because blockchain 153 is directly associated with the blockchain icon 146 upon which the file metadata 124 is dropped. In step 6008, the blockchain application is triggered by the dropping of file metadata 124 onto blockchain icon 146 to automatically blockchain file 126 to blockchain 153 by creating a new blockchain block 158 that includes file 126 as data. The process includes accessing file 126 based upon the dropping of file metadata 124 on blockchain icon 146. File metadata 124 is the metadata for file 126. The blockchain application also automatically accesses blockchain 153 as it is the blockchain directly associated with blockchain icon 146 that was selected for the dropping of file metadata 124. Blockchain 153 and file 126 are accessed on storage devices that may be on network 70, or local to computer 10. In step 6010, the blockchain application accesses hashing metadata from blockchain 153 to determine what hash algorithm was used and the number and type of hash digests used by blockchain 153 in order to create new blockchain block 158 to have the use the same hash algorithm and have the same type of hash digests. Then, the blockchain application accesses the hash digest information from prior blockchain block 156 and file 126 and hash processors 404 in order to create blockchain block 158. The creation of new blockchain block 158 is automatic upon the dragging and dropping of file metadata 124 onto the blockchain icon 146. The automatic creation of new blockchain blocks for the files that are dragged and dropped onto the icon 146 occurs directly upon the occurrence of the dragging and dropping of the file onto the icon 146. A single instance of dragging and dropping one or more files onto the icon 146 may produce a single new blockchain block. Alternatively, a single instance of dragging and dropping multiple files onto icon 146 may produce a separate new blockchain block for each file that is dragged and dropped in that one single instance. Separate blockchain blocks are created for each separate instance of dragging and dropping files onto the desktop icon. In step 6012, the blockchain application automatically appends the new blockchain block 158 to blockchain 153 and distributes the new blockchain block 158 onto distributed network 70 for storage on nodes 72 along with local storage on computer 10. The process ENDS with step 6014. Steps 6004 and 6006 are foreground processes. Steps 6008, 6010, and 6012 are background processes.

While the invention has been shown and described with reference to a particular embodiment thereof, it will be understood to those skilled in the art, that various changes in form and details may be made therein without departing from the spirit and scope of the invention.

The invention claimed is:

1. A tangible non-transitory computer-readable medium containing instructions for a method for accessing files from a blockchain with an application, comprising:
   extracting metadata from a blockchain storing files within its blockchain blocks;
   generating a graphical visualization of the blockchain on a Graphical User Interface that is populated with the extracted metadata;
   displaying a listing of the stored files for the blockchain using the extracted metadata when a Graphical User Interface pointing device is pointing at the graphical visualization of the blockchain; and
   accessing a selected file from the blockchain when it is selected from the listing using the Graphical User Interface pointing device.

2. The medium of claim 1, further comprising:
   generating a searchable listing of the stored files from the metadata extracted from the blockchain.

3. The medium of claim 2, further comprising:
   displaying a listing of blockchains accessible by an application; and
   selecting the particular blockchain from the listing of blockchains to display on the Graphical User Interface.

4. The medium of claim 3, wherein the files are selected from the group consisting of word processing files, spreadsheet files, executable files, image files, media files, video files, music files, text files, message files, email files, financial records, medical records, tax records, telephone records, and data files.

5. The medium of claim 2, further comprising:
   selecting a file from the searchable listing with the Graphical User Interface pointing device; and
   opening the file with an associated application.

6. The medium of claim 2, further comprising:
   retrieving the particular blockchain from a node of a distributed network;
   polling the distributed network to determine if the particular blockchain matches a majority of copies of the particular blockchain stored on the distributed network; and
   allowing an application to use the particular blockchain when the particular blockchain matches the majority of copies; and
   denying application from using the particular blockchain when the particular blockchain does not match the majority of copies.

7. The medium of claim 6, further comprising:
   generating an alert message on the application when the particular blockchain does not match the majority of copies.

8. A tangible non-transitory computer-readable medium containing instructions for a method of distributing files onto a distributed network through a blockchain, comprising:
   integrating files from a file manager into a blockchain stored on a distributed network by associating metadata for selected files within a graphical visualization of a blockchain;
   converting the graphical visualization of the blockchain into blockchain blocks for adding to the blockchain, wherein the blockchain blocks contain the selected files as data; and
   distributing the blockchain blocks onto the distributed network for storage.

9. The medium of claim 8, wherein the distributed network is a private distributed network formed of devices or cloud accounts that are not publicly accessible and are selected from the group consisting of a personal computer, an external drive, a mobile phone, a tablet, and a private account on a cloud storage system.

10. The medium of claim 9, further comprising:
    accessing a particular blockchain block from the blockchain stored on the private distributed network;
    polling the private distributed network to determine if the particular blockchain matches a majority of copies of the particular blockchain; and
    allowing a software application to use the particular blockchain when the particular blockchain matches the majority of copies; and
    denying the software application from using the particular blockchain when the particular blockchain does not match the majority of copies.

11. The medium of claim 8, further comprising:
    applying rules to the graphical visualization of a blockchain that prevent files from being associated with the blockchain blocks based on file type, file name, file metadata, the application associated with the file, or file size.

12. The medium of claim 10, wherein the files are selected from the group consisting of word processing files, spreadsheet files, executable files, image files, media files, video files, music files, text files, message files, email files, financial records, medical records, tax records, telephone records, and data files.

13. The medium of claim 9, further comprising:
    distributing an individual blockchain block from the blockchain stored on the private distributed network to a node outside of the private distributed network upon direction by a software application; and
    providing credentials to access the individual blockchain block to the node outside of the private distributed network.

14. The medium of claim 8, wherein the converting of the graphical visualization of the blockchain into blockchain blocks is done with a background computer process, wherein associating metadata for selected files within the virtual graphical visualization of a blockchain is based upon the action of a Graphical User Interface pointing device within an application.

15. A tangible non-transitory computer-readable medium containing instructions for a method for accessing files from a blockchain, comprising:
    extracting metadata on files stored within a blockchain;
    generating a graphical visualization of the blockchain on a Graphical User Interface with the extracted metadata;
    displaying a listing of the files stored on the blockchain on the Graphical User Interface; and accessing a selected file from the blockchain when it is selected from the listing.

16. The medium of claim 15, further comprising generating a searchable listing of the stored files from the metadata extracted from the blockchain, wherein the files are selected from the group consisting of word processing files, spreadsheet files, executable files, image files, media files, video files, music files, text files, message files, email files, financial records, medical records, tax records, telephone records, and data files.

17. The medium of claim 15, further comprising:

displaying a listing of blockchains accessible by an application; and selecting a blockchain from the listing of blockchains to display on the Graphical User Interface.

18. The medium of claim 15, further comprising:

retrieving the particular blockchain from a node of a distributed network;

polling the distributed network to determine if the particular blockchain matches a majority of copies of the particular blockchain stored on the distributed network; and allowing an application to use the particular blockchain when the particular blockchain matches the majority of copies; and denying the application from using the particular blockchain when the particular blockchain does not match the majority of copies.

19. The medium of claim 15, further comprising:

generating an alert message on the blockchain application when the particular blockchain does not match the majority of copies.

20. The medium of claim 15, wherein the blockchain is stored on a private distributed network formed of devices or cloud accounts that are not publicly accessible and are selected from the group consisting of a personal computer, an external drive, a mobile phone, a tablet, and a private account on a cloud storage system.

* * * * *